(12) United States Patent
Onozawa

(10) Patent No.: US 8,730,375 B2
(45) Date of Patent: May 20, 2014

(54) IMAGING APPARATUS HAVING FOCUS CONTROL FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/399,669

(22) Filed: Feb. 17, 2012

(65) Prior Publication Data

US 2012/0147223 A1 Jun. 14, 2012

Related U.S. Application Data

(62) Division of application No. 12/151,447, filed on May 7, 2008, now abandoned.

(30) Foreign Application Priority Data

May 18, 2007 (JP) .................................. 2007-133312

(51) Int. Cl.
H04N 5/232 (2006.01)
G03B 13/00 (2006.01)

(52) U.S. Cl.
USPC .......................................... 348/345; 348/349

(58) Field of Classification Search
USPC ................................. 348/345, 349
See application file for complete search history.

(56) References Cited

U.S. PATENT DOCUMENTS

| 7,526,193 | B2 | 4/2009 | Minato et al. |
| 7,643,082 | B2 | 1/2010 | Onozawa |
| 7,889,985 | B2 * | 2/2011 | Misawa et al. ................. 396/122 |
| 2002/0089516 | A1 * | 7/2002 | Sobol ............................ 345/620 |
| 2005/0063566 | A1 * | 3/2005 | Beek et al. .................... 382/115 |
| 2005/0270410 | A1 | 12/2005 | Takayama |
| 2006/0140614 | A1 | 6/2006 | Kim et al. |
| 2006/0181634 | A1 * | 8/2006 | Onozawa ...................... 348/345 |

(Continued)

FOREIGN PATENT DOCUMENTS

| CN | 1716078 A | 1/2006 |
| CN | 1823298 A | 8/2006 |

(Continued)

OTHER PUBLICATIONS

Japanese Office Action dated Jun. 27, 2011, and English translation thereof, issued in counterpart Japanese Application No. 2007-133312.

(Continued)

*Primary Examiner* — Joel Fosselman
(74) *Attorney, Agent, or Firm* — Holtz, Holtz, Goodman & Chick, PC

(57) ABSTRACT

A digital camera includes a focus position table. The focus position table, in which focus positions for person-priority pan focus have been set, is used when a face has been detected, and the focus position table, in which focus positions for non-person priority pan focus have been set corresponding to the types of non-person priority pan focus, is used when a face has not been detected. When a face has been detected, the digital camera determines the pan focus as the person-priority pan focus, and after acquiring a focus position from the focus position table, executes the pan focus processing. On the other hand, when a face has not been detected, the digital camera acquires, from the focus position table, a focus position corresponding to a type of non-person priority pan focus determined based on the photography scene and executes the pan focus processing.

19 Claims, 14 Drawing Sheets

(56) References Cited

U.S. PATENT DOCUMENTS

| | | |
|---|---|---|
| 2007/0003267 A1 | 1/2007 | Shibutani |
| 2007/0030375 A1* | 2/2007 | Ogasawara et al. ...... 348/333.11 |
| 2007/0096024 A1 | 5/2007 | Furuya et al. |
| 2007/0110422 A1* | 5/2007 | Minato et al. .................. 396/89 |

FOREIGN PATENT DOCUMENTS

| | | |
|---|---|---|
| CN | 1917585 A | 2/2007 |
| JP | 2003-075717 A | 3/2003 |
| JP | 2003-344891 A | 12/2003 |
| JP | 2005-070738 A | 3/2005 |
| JP | 2005-086682 A | 3/2005 |
| JP | 2006-227133 A | 8/2006 |
| JP | 2006-251653 A | 9/2006 |
| KR | 2006-74694 A | 7/2006 |
| KR | 2007-1817 A | 1/2007 |
| WO | WO 2005/006072 A1 | 1/2005 |

OTHER PUBLICATIONS

Chinese Office Action dated Sep. 18, 2009, and English translation thereof, issued in counterpart Chinese Application No. 200810161167.0.

Korean Office Action dated Jun. 1, 2009, and English translation thereof, issued in counterpart Korean Application No. 10-2008-0045597.

Chinese Office Action dated May 29, 2013 (and English translation thereof) in counterpart Chinese Application No. 200810161167.0.

\* cited by examiner

FIG. 2A

| Zoom Lens Position / Type of Pan Focus | ZOOM 1 | ZOOM 2 | ZOOM 3 | ZOOM 4 | ZOOM 5 | ZOOM 6 | ZOOM 7 |
|---|---|---|---|---|---|---|---|
| PERSON-PRIORITY PAN FOCUS | FOCUS POSITION AT DEPTH OF 1.3 TO 10 M | FOCUS POSITION AT DEPTH OF 1.5 TO 8 M | FOCUS POSITION AT DEPTH OF 1.8 TO 7 M | FOCUS POSITION AT DEPTH OF 2.2 TO 7 M | FOCUS POSITION AT DEPTH OF 2.7 TO 8 M | FOCUS POSITION AT DEPTH OF 3.0 TO 8M | FOCUS POSITION AT DEPTH OF 3.5 TO 8 M |

FIG. 2B

| Zoom Lens Position / Type of Pan Focus | ZOOM 1 | ZOOM 2 | ZOOM 3 | ZOOM 4 | ZOOM 5 | ZOOM 6 | ZOOM 7 |
|---|---|---|---|---|---|---|---|
| SHORT-DISTANCE PRIORITY PAN FOCUS | FOCUS POSITION AT DEPTH OF 1.0 TO 4.9 M | FOCUS POSITION AT DEPTH OF 1.2 TO 5.0 M | FOCUS POSITION AT DEPTH OF 1.5 TO 5.2 M | FOCUS POSITION AT DEPTH OF 1.8 TO 4.9 M | FOCUS POSITION AT DEPTH OF 2.1 TO 5.0 M | FOCUS POSITION AT DEPTH OF 2.0 TO 4.9 M | FOCUS POSITION AT DEPTH OF 2.6 TO 4.8 M |
| LONG-DISTANCE PRIORITY PAN FOCUS WITH FULL APERTURE | FOCUS POSITION AT DEPTH OF 1.4 TO ∞ M | FOCUS POSITION AT DEPTH OF 1.7 TO ∞ M | FOCUS POSITION AT DEPTH OF 2.2 TO ∞ M | FOCUS POSITION AT DEPTH OF 2.7 TO ∞ M | FOCUS POSITION AT DEPTH OF 3.5 TO ∞ M | FOCUS POSITION AT DEPTH OF 4.2 TO ∞ M | FOCUS POSITION AT DEPTH OF 5.1 TO ∞ M |
| LONG-DISTANCE PRIORITY PAN FOCUS WITHOUT FULL APERTURE | FOCUS POSITION AT DEPTH OF 0.9 TO ∞ M | FOCUS POSITION AT DEPTH OF 1.0 TO ∞ M | FOCUS POSITION AT DEPTH OF 1.4 TO ∞ M | FOCUS POSITION AT DEPTH OF 1.8 TO ∞ M | FOCUS POSITION AT DEPTH OF 2.4 TO ∞ M | FOCUS POSITION AT DEPTH OF 3.0 TO ∞ M | FOCUS POSITION AT DEPTH OF 3.7 TO ∞ M |

FIG. 5

| SIZE OF FACE DETECTION FRAME | ZOOM 1 | ZOOM 2 | ZOOM 3 | ZOOM 4 | ZOOM 5 | ZOOM 6 | ZOOM 7 |
|---|---|---|---|---|---|---|---|
| SIZE 1 | ....m | ....m | ....m | ....m | ....m | ....m | ....m |
| SIZE 2 | ....m | ....m | ....m | ....m | ....m | ....m | ....m |
| SIZE 2 | ....m | ....m | ....m | ....m | ....m | ....m | ....m |
| ..... | ..... | ..... | ..... | ..... | ..... | ..... | ..... |

IMAGING APPARATUS HAVING FOCUS CONTROL FUNCTION

CROSS-REFERENCE TO RELATED APPLICATIONS

This is a Divisional of U.S. application Ser. No. 12/151,447, filed May 7, 2008, now abandoned which is based upon and claims the benefit of priority from prior Japanese Patent Application No. 2007-133312, filed May 18, 2007, the entire contents of both of which are incorporated herein by reference.

BACKGROUND OF THE INVENTION

1. Field of the Invention

The present invention relates to an imaging apparatus and a focus control method that can be used for a digital camera having a focus control function.

2. Description of the Related Art

Some conventional imaging apparatuses, for example, some digital cameras are equipped with a pan focus (deep focus) function in addition to a standard auto focus function (for example, refer to Japanese Laid-Open (Kokai) Patent Publication No. 2005-070738).

This pan focus function refers to a function by which a focus lens moves to a predetermined lens position at which the possibility that a photographic subject is focused is high, and has advantages of easier control and shorter time for focusing than auto focus function.

However, as a focus lens only moves to a predetermined lens position, a situation may occur in which the photographic subject the user truly desires to focus is not focused.

The present invention has been conceived in light of the foregoing situations, and is to provide an imaging apparatus and a focus control method that substantially enhance the possibility that the photographic subject the user truly desires to focus on is focused.

SUMMARY OF THE INVENTION

In order to achieve the above-described purpose, in accordance with one aspect if the present invention, there is provided an imaging apparatus comprising: an imaging section for imaging a photographic subject; a face detecting section for detecting a human face from an image picked up by the imaging section; a first focus control section for moving a focus lens to a first lens position when a face has been detected from an image by the face detecting section; and a second focus control section for moving a focus lens to a second lens position which is different from the first lens position when a face has not been detected from an image by the face detecting section.

In accordance with another aspect of the present invention, there is provided a focus control method in an imaging apparatus including an imaging section for imaging a photographic subject, comprising: a face detecting step for detecting a human face from an image picked up by the imaging section; a first focus control step for moving a focus lens to a first lens position when a face has been detected from an image by the face detecting step; and a second focus control step for moving a focus lens to a second lens position which is different from the first lens position when a face has not been detected from an image by the face detecting step.

In accordance with another aspect of the present invention, there is provided a computer-readable storage medium having a program of focus control stored thereon that is executable by a computer for controlling an imaging apparatus including an imaging section for imaging a photographic subject, comprising: a face detecting step for detecting a human face from an image picked up by the imaging section; a first focus control step for moving a focus lens to a first lens position when a face has been detected from an image by the face detecting step; and a second focus control step for moving a focus lens to a second lens position which is different from the first lens position when a face has not been detected from an image by the face detecting step.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWING

FIGS. 2A and 2B shows focus position tables stored in a read only memory (ROM) 21;

FIG. 5 shows a photographic subject distance table stored in the ROM 21;

DETAILED DESCRIPTION OF THE PREFERRED EMBODIMENTS

The present invention will hereinafter be described in detail with reference to the preferred embodiments in which an imaging apparatus is applied to a digital camera as an example shown in the accompanying drawings.

A. First Embodiment

A-1. Configuration of the Digital Camera

Figure 1:
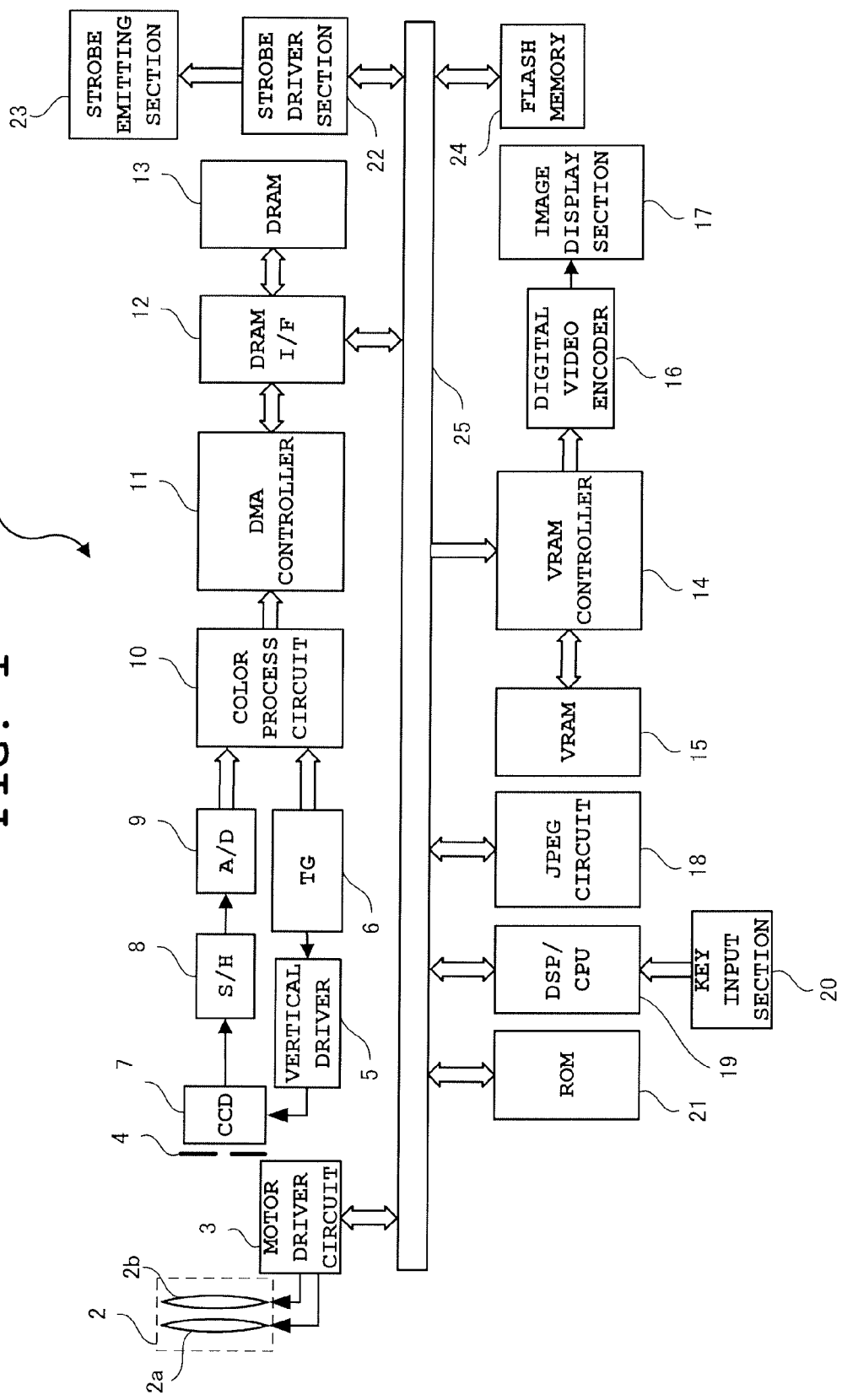
FIG. 1 is a block diagram of a digital camera according to an embodiment of the present invention.

FIG. 1 is a block diagram showing an electric schematic of a digital camera 1 which realizes an imaging apparatus according to the present invention.

The digital camera 1 includes an imaging lens 2 (which includes a focus lens 2a and a zoom lens 2b), a motor driver circuit 3, a shutter-aperture 4, a vertical driver 5, a timing generator (TG) 6, a charge-coupled device (CCD) 7, a sample hold circuit 8, an analog-digital converter 9, a color process circuit 10, a direct memory access (DMA) controller 11, a dynamic random access memory (DRAM) interface 12, a dynamic random access memory (DRAM) 13, a video random access memory (VRAM) controller 14, a video random access memory (VRAM) 15, a digital video encoder 16, an image display section 17, a Joint Photographic Experts Group (JPEG) circuit 18, a digital signal processor (DSP)/central processing unit (CPU) 19, a key input section 20, a read only memory (ROM) 21, a strobe driver section 22, a strobe emitting section 23, a flash memory 24 and a bus 25.

The imaging lens 2 includes the focus lens 2a, the zoom lens 2b and the like each of which includes a plurality of lens groups. The imaging lens 2 is connected with the motor driver circuit 3. The motor driver circuit 3 includes a focus motor, a zoom motor, a focus motor driver and a zoom motor driver. The focus motor and the zoom motor respectively drive the focus lens 2a and the zoom lens 2b in the optical axis direction. The focus motor driver and the zoom motor driver respectively drive the focus lens 2a and the zoom lens 2b in the optical axis direction in adherence to a control signal sent from the DSP/CPU 19.

The shutter-aperture 4 includes a driver circuit not shown, and activates the shutter-aperture in adherence to a control signal sent from the DSP/CPU 19. The shutter-aperture functions as an aperture and a shutter.

The aperture refers to a mechanism that controls an amount of light that is irradiated from the imaging lens 2. The shutter refers to a mechanism that controls a period of time during which light is irradiated to the CCD 7. The period of time during which light is irradiated to the CCD 7 varies depending on a speed at which the shutter is opened and closed (that is, a shutter speed). The exposure can be determined based on the aperture and the shutter speed.

The CCD 7 is driven for scanning by the vertical driver 5 and the TG 6, and after photo-electrically converting the light intensity of the respective colors in the RGB value of a photographic subject image formed at a constant cycle, outputs them to the sample hold circuit 8. In addition, the CCD 7 also has a function as an electronic shutter. A shutter speed of this electronic shutter is controlled by the DSP/CPU 19 via the vertical driver 5 and the TG 6.

The sample hold circuit 8 performs sampling (for example, correlated double sampling) on an analog signal sent from the CCD 7 at a frequency that is matched for the resolution of the CCD 7, and outputs the signal to the analog-digital converter 9. In addition, an automatic gain control (AGC) may be performed after sampling.

The analog-digital converter 9 converts a sampled analog signal to a digital signal, and outputs the digital signal to the color process circuit 10.

The color process circuit 10 performs color processing including white balance processing, interpolation processing, gamma correction processing and the like, and generates a luminosity color-difference signal (YUV signal) from the RGB data.

The DMA controller 11, without interposition of the DSP/CPU 19, transfers data with the DRAM 13 via the color process circuit 10 and the DRAM interface 12.

The DRAM interface 12 is a signal interface between the DMA controller 11 and the DRAM 13, and a signal interface between the DRAM 13 and the bus 25.

The DRAM 13, which is a type of rewritable semi conductors, is used as not only a buffer memory that temporarily stores an image data (that is, a YUV signal generated in the color process circuit 10) picked up by the CCD 7 but also a working memory of the DSP/CPU 19.

The VRAM controller 14 is a section that controls data transfer between the VRAM 15 and the bus 25, and data transfer between the VRAM 15 and the digital video encoder 16. Specifically, the VRAM controller 14 is a section that controls writing of an image data to be displayed on the VRAM 15, and reading out of the same image data from the VRAM 15.

The VRAM 15 refers to a so called video RAM, which is a memory that temporarily stores an image data for a through image, a replay image or the like.

The digital video encoder 16 converts an image data in a form of a digital signal that has been read out from the VRAM 15 into an analog signal, and sequentially outputs the signals at a timing in accordance with the scanning method of the image display section 17.

The image display section 17 displays an image of an image data in a form of an analog signal is sent from the digital video encoder 16.

The JPEG circuit 18 is a section that performs compression and expansion of joint photographic experts group (JPEG). The JPEG circuit 18 performs JPEG compression of an image data (YUV signal) stored in the DRAM 13 in adherence to a control signal from the DSP/CPU 19, and performs JPEG expansion of an image data recorded in the flash memory 24.

The key input section 20 includes a plurality of operation keys such as a shutter button enabling both half-depression and full-depression, a mode selection key, zoom keys (a Wide key and a Tele key), a SET key, and a cursor key, and outputs operational signals that correspond to the key operations by the user to the DSP/CPU 19.

The strobe driver section 22 drives the strobe emitting section 23 to flash in adherence to a control signal from the DSP/CPU 19, and the strobe emitting section 23 flashes a strobe light. When judged that the photography scene is dark based on the luminance component of a signal outputted from the CCD 7 or by a photometric circuit not shown, the DSP/CPU 19 sends a control signal to the strobe driver section 22.

Note that the flash memory 24 is a recording medium that stores and records a compressed image data.

The DSP/CPU 19 is a one-chip microcomputer having a function that performs zoom processing, AE processing, focus processing, face detecting processing and the like, and controls each of the above-described sections of the digital camera 1. In addition, the DSP/CPU 19 includes a clock circuit which clocks date and time and functions as a timer.

The ROM 21 stores control programs necessary for each section of the DSP/CPU 19, that is, programs and data necessary for various controls such as the AE processing and the focus processing, and functions as the imaging apparatus of the present invention by being activated in accordance with the programs.

In addition, the ROM 21 stores focus position tables for pan focus. Note that the pan focus refers to acquiring a focus position (that is, a focus lens position) or a photographic subject distance without executing the auto-focus processing, and moving the focus lens 2a to the focus position acquired or the focus position corresponding to the photographic subject distance.

FIG. 2A shows a focus position table which is used in the case where a face has been detected (i.e., which is used when judged that the type of the priority pan focus is the pan focus prioritizing a person (hereinafter referred to as a "person-priority pan focus")). The individual focus positions for pan focus corresponding to zoom magnifications have been set in the table.

FIG. 2B shows a focus position table which is used in the case where a face has not been detected (i.e., which is used when judged that the type of the priority pan focus is a pan focus prioritizing a photographic subject other than persons (hereinafter referred to as a "non-person priority pan focus")). The non-person priority pan focus is further classified into three types: a short-distance priority pan focus, a long-distance priority pan focus with full aperture, and a long-distance priority pan focus without full aperture.

Focus positions for pan focus corresponding to zoom magnifications and individual types of the non-person priority pan focus (the short-distance priority pan focus, the long-distance priority pan focus with full aperture, or the long-distance priority pan focus without full aperture) have been set in the focus position table which is used in the case where a face has not been detected.

The focus position table shown in FIG. 2B can be considered as a complex of focus position tables that is used for each type of non-person priority pan focuses. In the case where a face has not been detected, the photography scene is judged, and the focus position table for any type of non-person priority pan focus is used based on the judged result.

As apparent from FIG. 2A and FIG. 2B, the zoom magnifications are classified into 7 stages: Zoom 1 to Zoom 7. Zoom 1 indicates the state in which substantially no zooming is performed (that is, approx. 1-fold), and Zoom 7 indicates the state in which zooming is fully performed (that is, the state in which the zoom magnification is closed to the maximum).

The focus position for the pan focus is consequently determined from the tables shown in FIG. 2A and FIG. 2B based on the zoom magnification and the type of the priority pan focus (the person-priority pan focus, the short-distance priority pan focus, the long-distance priority pan focus with full aperture, or the long-distance priority pan focus without full aperture).

For example, when the type of the priority pan focus is the person-priority pan focus and the zoom magnification is Zoom 4, the focus position at which the depth of field is 2. 2 to 7 m is acquired. When the type of the priority pan focus is the long-distance priority pan focus with full aperture and the zoom magnification is Zoom 2, the focus position at which the depth of field is 1. 7 to 8 m is acquired.

A-2. Functions of the Digital Camera 1

Functions of individual configuration featuring the digital cameral in the present embodiment will hereinafter be described.

[Operation of the Digital Camera 1]

Operation of the digital camera 1 according to a first embodiment will hereinafter be described with reference to a flowchart of FIG. 3.

When a pan focus shooting mode is set by user operation of the mode selection key in the key input section 20, the DSP/CPU 19 starts imaging a photographic subject using the CCD 7, and executes the AE processing with a focal length corresponding to the lens position of the current zoom lens 2b. The DSP/CPU 19 also starts image processing such as white balance processing in the color process circuit 10 (Step S1).

When exposure, white balance and the like are set, after starting the processing of storing an image data picked up by the CCD 7 in the DRAM 13 (buffer memory), the DSP/CPU 19 stores the stored image data in the VRAM 15, and starts the processing of displaying the picked-up image data in the image display section 17 via the digital video encoder 16. That is, the DSP/CPU 19 starts a so called through image display (Step S2).

Next, at Step S3, the DSP/CPU 19 judges whether the zoom operation has been performed by the user. This judgment is made based on whether an operational signal corresponding to the operation of the zoom key (the Wide key, the Tele key) has been sent from the key input section 20. At this time, the user performs the operation of the Tele key when the user desires to zoom in the photographic subject, and performs the operation of the Wide key when the user desires to zoom out the photographic subject.

When judged at Step S3 that the zoom operation has been performed, the DSP/CPU 19 advances to Step S4. At Step S4, the DSP/CPU 19 executes the zoom processing in accordance with the zoom operation, and advances to Step S5. At this time, the DSP/CPU 19 executes the zoom processing for zooming out the photographic subject when the operation of the Wide key has been performed, and executes the zoom processing for zooming out the photographic subject when the operation of the Tele key has been performed.

The zoom processing may be optical zoom, electronic zoom processing, or a combination of optical zoom and electronic zoom processing. In the case of the optical zoom, the DSP/CPU 19 moves the zoom lens 2b in accordance with the operation of the zoom key. For example, the DSP/CPU 19 moves the zoom lens toward the telescopic side when the Tele key is operated, and the DSP/CPU 19 moves the zoom lens toward the wide angle side when the Wide key is operated. In addition, in the case of the electronic zoom processing, the DSP/CPU 19 trims away the image data to the trimming size in accordance with the operation of the zoom key, and displays the trimmed image data in an enlarged form. For example, the DSP/CPU 19 displays the trimmed image in an enlarged form by decreasing the trimming size when the Tele key is operated, and displays the trimmed image in an enlarged form by increasing the trimming size when the Wide key is operated.

On the contrary, when judged at Step S3 that the zoom operation has not been performed, it advances to Step S5 without executing any further processing.

At Step S5, the DSP/CPU 19 judges whether the shutter button has been half depressed by the user. This judgment is made based on whether an operational signal corresponding to the half-depression operation of the shutter button has been sent from the key input section 20.

When judged at Step S5 that the shutter button has not been half depressed, the DSP/CPU 19 returns to Step S3. On the other hand, when judged at Step S5 that the shutter button has been half depressed, the DSP/CPU 19 advances to Step S6. At Step S6, the DSP/CPU 19 determines and locks the photographic conditions such as exposure values (that is, an aperture value, a shutter speed and an amplification factor), a white balance value and the like for the present shooting based on a through image acquired immediately before the half depression of the shutter button. At the same time, the DSP/CPU 19 judges which mode, among a compulsory flash mode, an auto-strobe mode and a flash disable mode, the strobe mode is in. When the strobe mode is the auto-strobe mode, the DSP/CPU 19 further judges whether a luminance component of a signal outputted from the CCD 7 (that is, the through image acquired immediately before the half depression of the shutter button) or the image picked up by a photometric circuit not shown is dark, and then judges whether to flash a strobe. Thereafter, it locks the photographic conditions such as strobe flash ON/OFF.

At subsequent Step S7, the DSP/CPU 19 acquires the present zoom magnification.

At subsequent Step S8, the DSP/CPU 19 executes the face detecting processing based on the image data picked up immediately before or immediately after the half depression of the shutter button. In other words, the DSP/CPU 19 executes the processing of detecting whether a human face is present in the image data. This face detecting processing detects a face which proportion to the whole picked-up image is not less than 10% in size. In other words, a small face which proportion to the whole picked-up image is not less than 10% in size is detected.

As a result of this, the DSP/CPU 19 can judge whether the user desires to shoot a person. This is because, for example, a photographic subject having a face which proportion to the whole image is not less than 10% in size should be located far away from the photographer, and thus such photographic subject can be considered as a mere passer-by, or an utterly unrelated person to the photographer. It is common to take a photograph such that a person the photographer desires to shoot appears with a larger face to some extent.

Since the face detecting processing is a known art, it will not be further explained in detail. However, the face detecting processing may be a processing, for example, of detecting whether an image data of a human face is present in the picked-up image by comparing a character data of general human faces that have been stored in advance (that is, character data on eyes, eyebrows, nose, mouth, ears and the like), or any other processing that detects a human face.

At subsequent Step S9, the DSP/CPU 19 judges whether a face has been detected.

When judged at Step S9 that a face has been detected, the DSP/CPU 19 judges that the true photographic subject the photographer desires to shoot is a person, and advances to Step S10. At Step S10, the DSP/CPU 19 determines that the type of the priority pan focus is the person-priority pan focus. As a result of this, the DSP/CPU 19 acquires a focus position for the pan focus using the focus position table shown in FIG. 2A.

When determined that the type of the priority pan focus is the person-priority pan focus, the DSP/CPU 19 advances to Step S11. At Step S11, the DSP/CPU 19 acquires a focus position for prioritizing a person from the focus position table shown in FIG. 2A based on the zoom magnification acquired at Step S7, and advances to Step S14. That is, when a face which proportion to the whole picked-up image is not less than 10% in size has been detected, in other words, when a person is present within a predetermined distance from the photographer (that is, the digital camera 1), the DSP/CPU 19 acquires the pan focus position for prioritizing a person. Thereby, it is possible to acquire the focus position for the pan focus at which a person who is present within a predetermined distance from the photographer and who is the true photographic subject the photographer desires to shoot is focused, and it is possible to focus on the photographic subject quickly.

Only the lower limit of proportion (10% in this case) of a face size to the whole picked-up image is given in this case, but both upper and lower limits of the proportion may be given. It is possible to confine the distance from the photographer to the person who serves as a photographic subject by setting the detecting processing to detect only a face which proportion to the whole image from 10% to 30%, for example, in size. It is possible to acquire the focus position for the pan focus at which a person is focused with higher accuracy by recording the pan focus position corresponding to the confined distance in the focus position table.

On the contrary, when judged at Step S9 that a face has not been detected, the DSP/CPU 19 determines that the type of the priority pan focus is the non-person priority pan focus, and advances to Step S12. At Step S12, the DSP/CPU 19 executes the determination processing of the type of the non-person priority pan focus based on the photography scene. Specifically, the DSP/CPU 19 judges the present photography scene, and determines the type of the non-person priority pan focus based on this photography scene. The determination processing will be described later.

When a face has not been detected, the DSP/CPU 19 acquires a focus position using the focus position table as shown in FIG. 2B. Focus positions differ depending on the types of the non-person priority pan focus (that is, whether the type of the non-person priority is the short-distance priority pan focus, the long-distance priority pan focus with full aperture, or the long-distance priority pan focus without full aperture), therefore the DSP/CPU 19 need to determine the type of the non-person priority pan focus based on the photography scene.

Subsequently, the DSP/CPU 19 advances to Step S13. At Step S13, the DSP/CPU 19 acquires the focus position for the pan focus from the focus position table shown in FIG. 2B based on the type of the non-person priority pan focus determined by the determination processing at Step S10 and the zoom magnification acquired at Step S7, and advances to Step S14.

Suppose the case where the type of the priority pan focus is determined as the short-distance priority pan focus and the zoom magnification acquired is Zoom 3. In this case, the DSP/CPU 19 acquires the focus position at which the depth of field is 1.5 to 5.2 m.

At Step S14, it moves the focus lens 2a to the pan focus position it has acquired by sending a control signal to the motor driver circuit 3.

At subsequent Step S15, the DSP/CPU 19 judges whether the shutter button has been fully depressed by the user. This judgment is made based on whether an operational signal corresponding to the full-depression operation of the shutter button has been sent from the key input section 20.

When judged at Step S15 that the shutter button has not been fully depressed, the DSP/CPU 19 remains at Step S15 until the shutter button is fully depressed. Then, when judged that the shutter button has been fully depressed, the DSP/CPU 19 advances to Step S16. At Step S16, the DSP/CPU 19 executes the still image shooting processing under the photographic conditions locked at Step S6, and records a still image data compressed by the JPEG circuit 18 in the flash memory 24.

Next, the determination processing of the priority pan focus based on the photography scene will be described with reference to a sub-flowchart of FIG. 4.

In this case, the DSP/CPU 19 judges the photography scene based on the judgment on whether the shooting is with a strobe flash, whether the illumination is either one of ultra-high illumination and ultra-low illumination, whether a flicker has been detected, whether a light source is sunlight and whether an aperture is full. Then, based on this photography scene, the DSP/CPU 19 executes the determination processing on whether the type of pan focus is the short-distance priority pan focus, the long-distance priority pan focus with full aperture, or the long-distance priority pan focus without full aperture.

Figure 3:
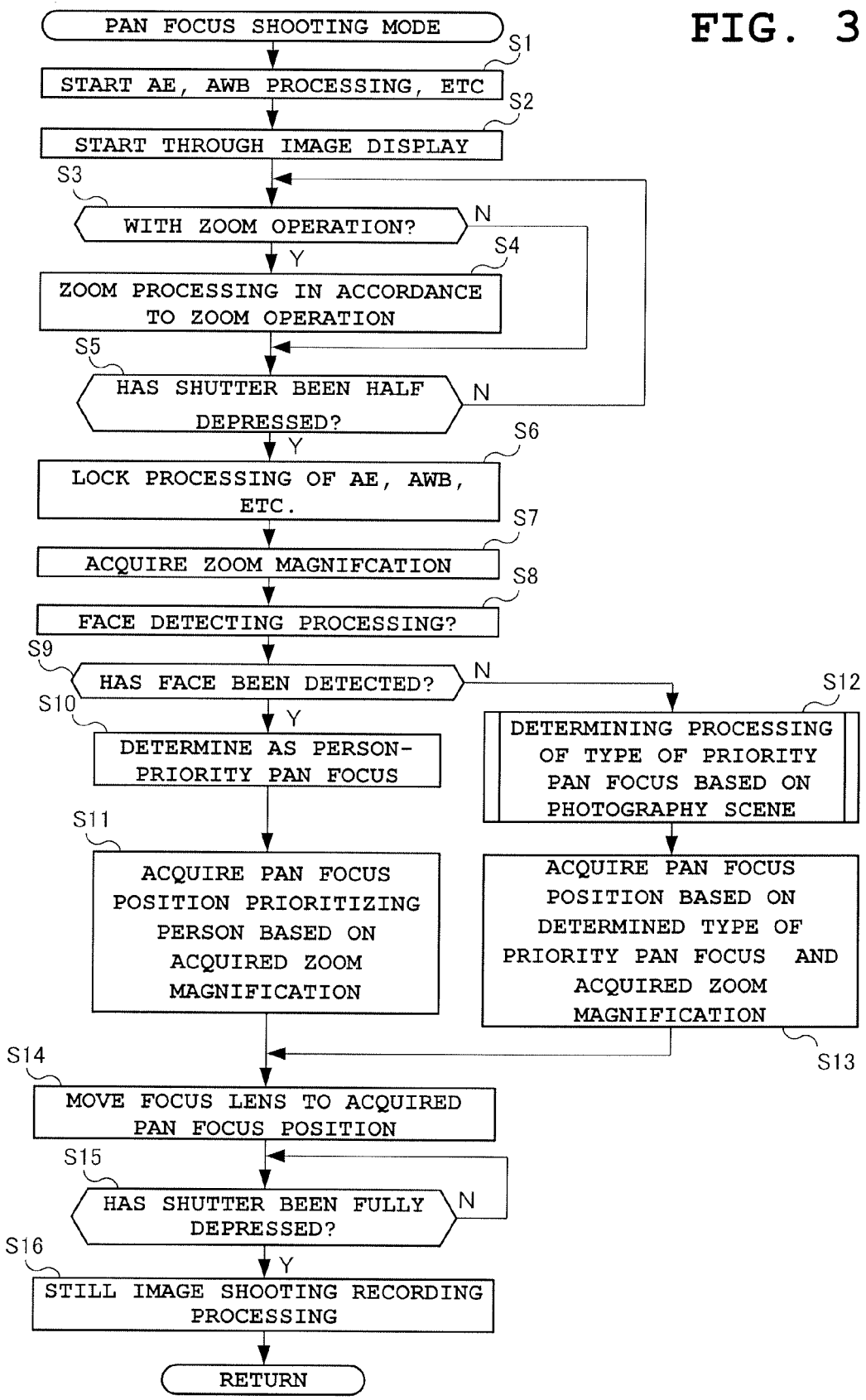
FIG. 3 is a flowchart showing an operation of a digital camera according to a first embodiment.
Figure 4:
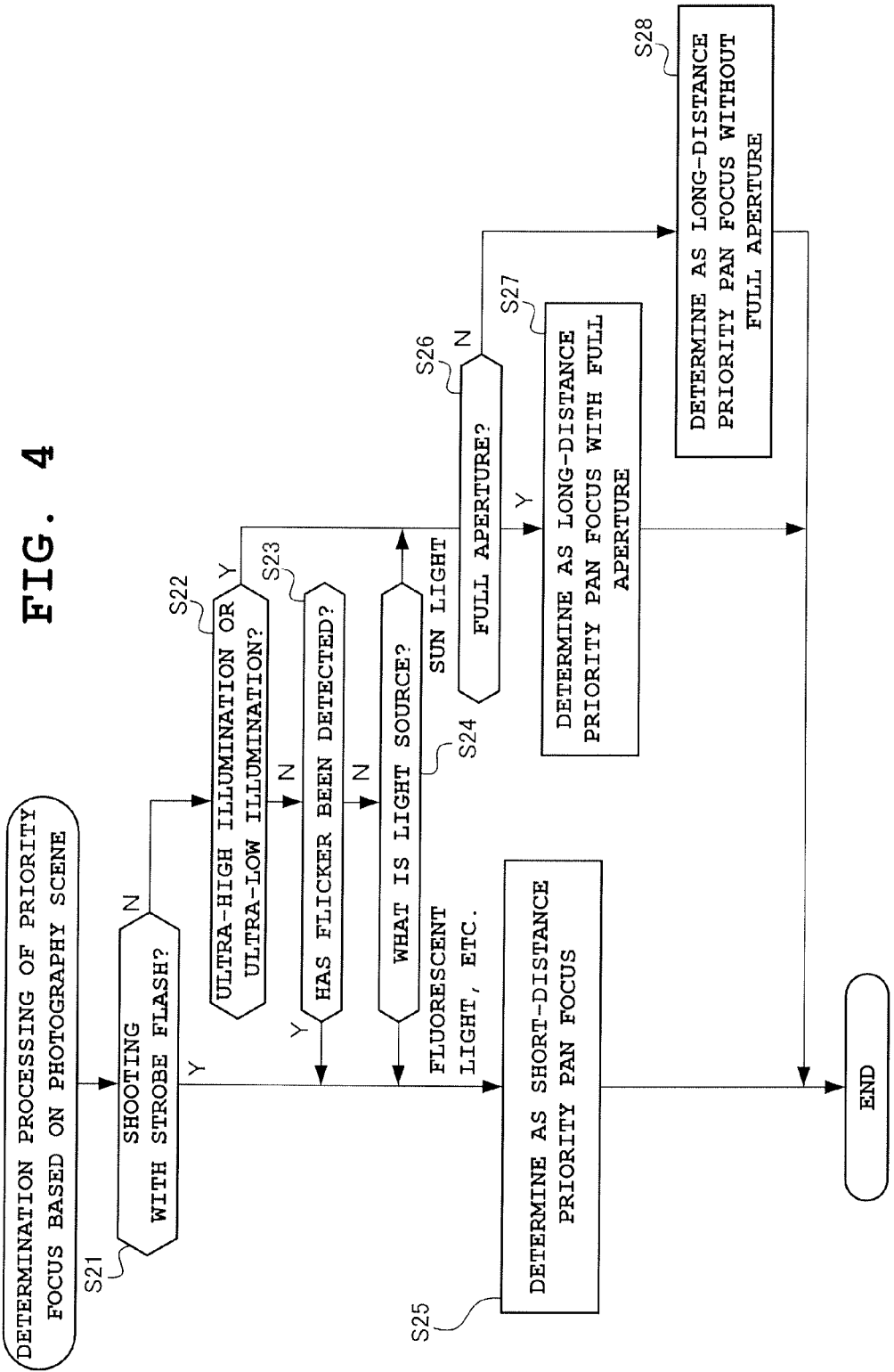
FIG. 4 is a sub-flowchart showing an operation of determination processing of priority pan focus based on a photography scene.

When advanced to Step S12 in FIG. 3, The DSP/CPU 19 then advances to Step S21 in FIG. 4. At Step S21, the DSP/CPU 19 judges whether the shooting is with a strobe flash. The judgment is made based on the photographic conditions locked at Step S6 in FIG. 3.

When judged at Step S12 that the shooting is with a strobe flash, the DSP/CPU 19 advances to Step S25. On the other hand, when judged that the shooting is not with a strobe flash, the DSP/CPU 19 advances to Step S22.

When judged that the shooting is not with a strobe flash and advanced to Step S22, the DSP/CPU 19 judges whether the illumination is either one of ultra-high illumination and ultra-low illumination based on the photographic conditions locked at Step S6 in FIG. 3 (or the through image acquired when the shutter button has been half depressed). When judged that the illumination is either one of ultra-high illumination and ultra-low illumination, the DSP/CPU 19 advances to Step S26. On the other hand, when judged that the illumination is not ultra-high illumination or ultra-low illumination, the DSP/CPU 19 advances to Step S23. This judgment on ultra-high illumination and ultra-low illumination is made based on the quantity of electric charge into which light irradiated to the CCD 7 has been converted.

When judged that the illumination is not either ultra-high illumination or ultra-low illumination and advanced to Step S23, the DSP/CPU 19 judges whether a flicker has been detected in a through image acquired when the shutter button has been half depressed. When judged that a flicker has been detected, the DSP/CPU 19 advances to Step S25, and when judged that a flicker has not been detected, it advances to Step S24.

When judged that a flicker has not been detected and advanced to Step S24, the DSP/CPU 19 judges whether a light source is sunlight. This judgment is made based on the white balance among the photographic conditions locked at Step S6. Specifically, when judged that a color temperature of a light source of light acquired by the automatic white balance processing in the color process circuit 10 is the color temperature of sunlight, the light source is judged to be sunlight. On the other hand, when judged that a color temperature of a light source of light acquired by the automatic white balance processing is not the color temperature of the sunlight, the light source is judged to be other than sunlight (fluorescent lighting, incandescent lighting or the like). When judged at Step S24 that the light source is not sunlight, it advances to Step S25. On the other hand, when judged that the light source is sunlight, it advances to Step S26.

The DSP/CPU 19 determines that the type of the priority pan focus is the short-distance priority pan focus (Step S25), when judged at Step S21 that the shooting is with a strobe flash, when judged at Step S23 that a flicker has been detected, or when judged at Step S24 that a light source is not sunlight.

On the contrary, the DSP/CPU 19 advances to Step S26, when judged at Step S22 that the illumination is either one of ultra-high illumination and ultra-low illumination, or when judged at Step S24 that the light source is sunlight. At Step S26, the DSP/CPU 19 judges whether the aperture is full. This judgment is made based on the photographic conditions locked at Step S6.

When judged at Step S26 that the aperture is full, the DSP/CPU 19 determines that the type of the priority pan focus is the long-distance priority pan focus with full aperture (Step S27). On the other hand, when judged that the aperture is not full, the DSP/CPU 19 determines that the type of the priority pan focus is the long-distance priority pan focus without full aperture (Step S28).

After the determination of the priority pan focus, the DSP/CPU 19 advances to Step S13 in FIG. 3.

As described above, the DSP/CPU 19 determines the type of the priority pan focus based on the photography scene.

In this case, the face detecting processing and the priority pan focus determination processing based on the photography scene are executed after a half depression of the shutter button. Instead, the face detecting processing may be executed periodically while the through image is being displayed before a half depression of the shutter button. Alternatively, both the face detecting processing and the priority pan focus determination processing based on the photography scene may be executed periodically. Thereby, it is possible to execute the pan focus processing quickly after a half depression of the shutter button.

As described so far above, in the first embodiment, when a face is detected, the DSP/CPU 19 judges that the true photographic subject the photographer desires to shoot is a person, and executes the pan focus processing using the focus position table for the person-priority pan focus (that is, the focus position table as shown in FIG. 2A). On the other hand, when a face is not detected, the DSP/CPU 19 judges that the true photographic subject the photographer desires to shoot is a landscape or the like, and executes the pan focus processing using the focus position table for the background-priority pan focus (that is, the focus position table as shown in FIG. 2B). Accordingly, it is possible to focus appropriately and quickly corresponding to the photographic subject to shoot. In addition, it is possible to substantially enhance the possibility that the true photographic subject is focused in the pan focus processing.

Furthermore, the DSP/CPU 19 verifies the zoom magnification when executing the pan focus processing. Accordingly, it is possible to execute the pan focus processing on the true photographic subject appropriately, and therefore it is possible to substantially enhance the possibility that the true photographic subject is focused in the pan focus processing.

Furthermore, the DSP/CPU 19 can detect truly desired photographic subject since the DSP/CPU 19 does not detect a face which size is less than 10% of the whole picked-up image in size. Specifically, since a small face which proportion is less than 10% in size is located far away from the photographer, and such face is not considered as the photographic subject the user truly desires to shoot but is considered as a mere passer-by who does not have any relation to the photographer, and thus such face can be considered as a part of the landscape.

Furthermore, when a face has not been detected, the DSP/CPU 19 determines the type of the non-person priority pan focus based on the photography scene, and executes the pan focus processing using the focus position table for the non-person priority pan focus of the type determined. Accordingly, it is possible to appropriately and quickly execute the pan focus processing corresponding to the photography scene. In addition, it is possible to execute the pan focus processing with high accuracy on a photographic subject other than a person, for example, a landscape or the like. In addition, it is possible to substantially enhance the possibility that the true photographic subject is focused in the pan focus processing.

B. A Variation Example of the First Embodiment

The following variation example of the first embodiment as described above is possible.

In the above-described first embodiment, when a face which proportion to the whole picked-up image in size is not less than 10% is detected, the DSP/CPU 19 determines that the type of the priority pan focus is the person-priority pan focus, and acquire the focus position based on only the zoom magnification from the pan focus table for person-priority pan focus. Instead, in the present variation example, the focus position is changed based on the size of the detected face or the like.

In the present variation example, in place of the focus position table shown in FIG. 2A, the photographic subject distance table as shown in FIG. 5 has been recorded in the ROM 21. The individual photographic subject distances corresponding to the size of the face detecting frame and the zoom magnification have been set in this photographic subject distance table. The face detecting frame will be described later.

The operation of the present variation example will hereinafter be described with reference to the flowchart of FIG. 6A.

Figure 6A:
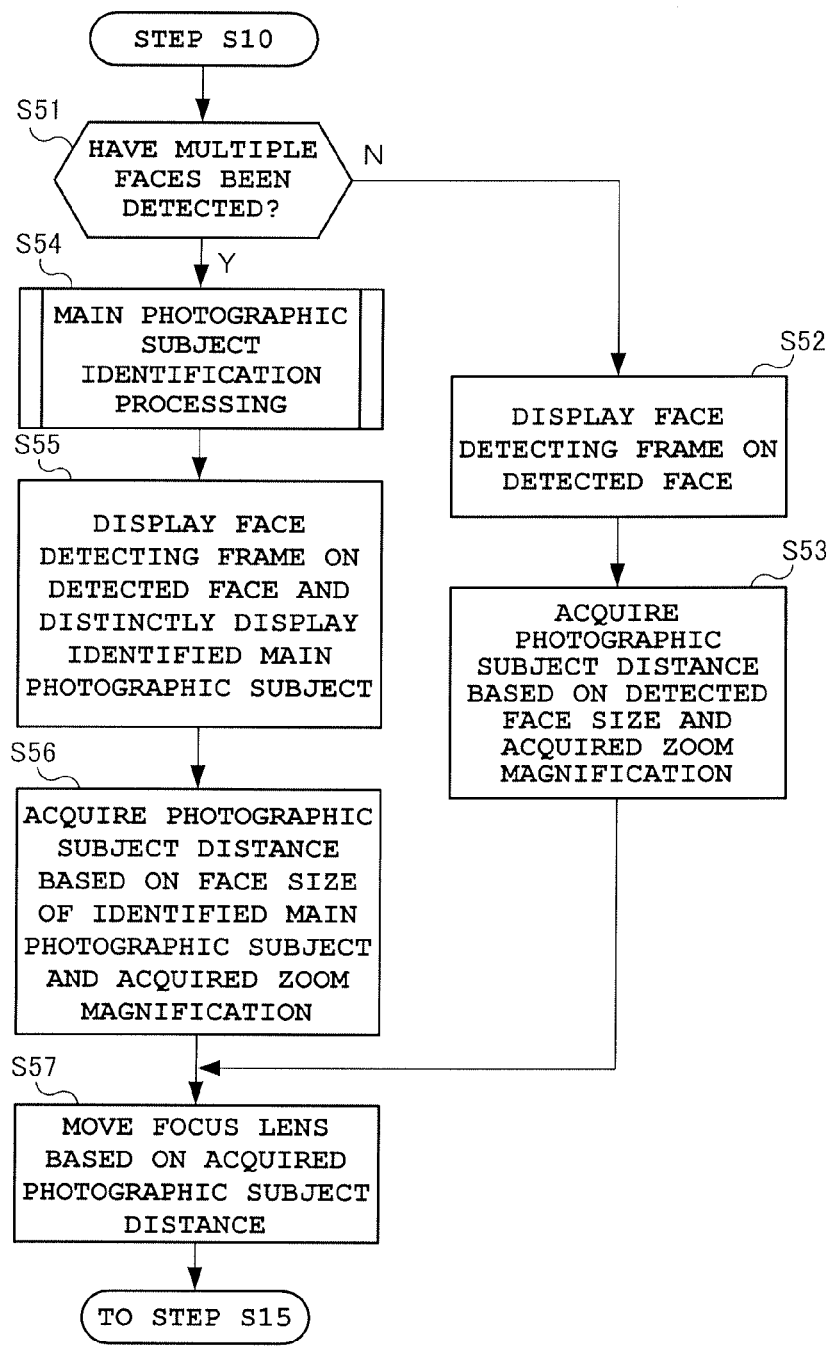
FIG. 6A is a flowchart showing an operation of a variation example of the first embodiment.

When determined at Step S10 in FIG. 3 that the type of the priority pan focus is the person-priority pan focus, the DSP/CPU 19 advances to Step S51 in FIG. 6A. At FIG. 6A, the DSP/CPU 19 judges whether multiple faces have been detected by the face detecting processing at Step S6 in FIG. 3.

When judged at Step S51 that multiple faces have not been detected, that is, when judged that only a single face has been detected, the DSP/CPU 19 advances to Step S52. At Step S52, the DSP/CPU 19 displays the face detecting frame based on a zone of the detected face.

Figure 7A:
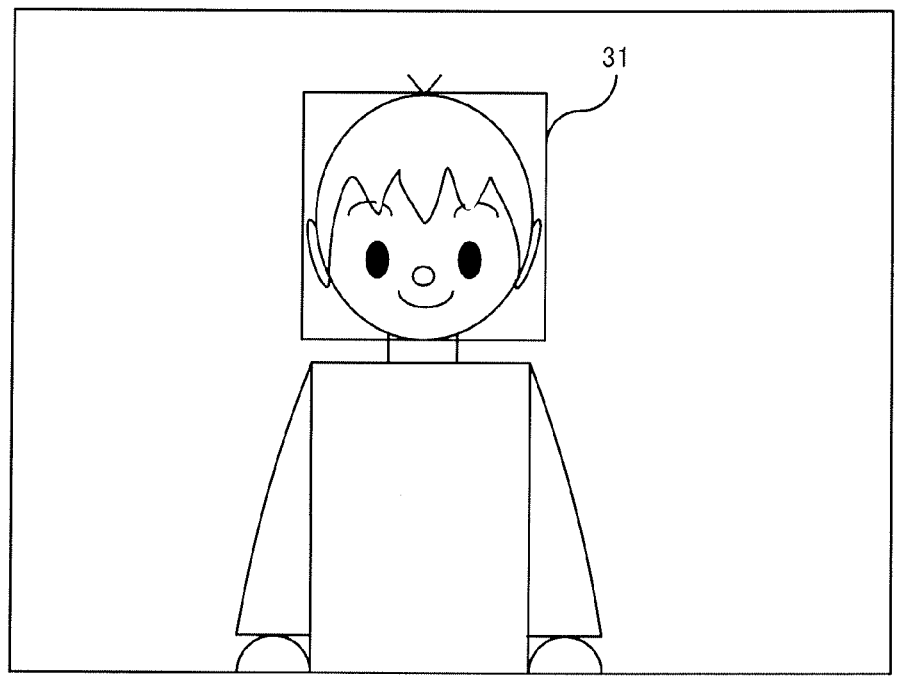
FIGS. 7A and 7B are diagrams showing face detecting frames to be displayed.
Figure 7B:
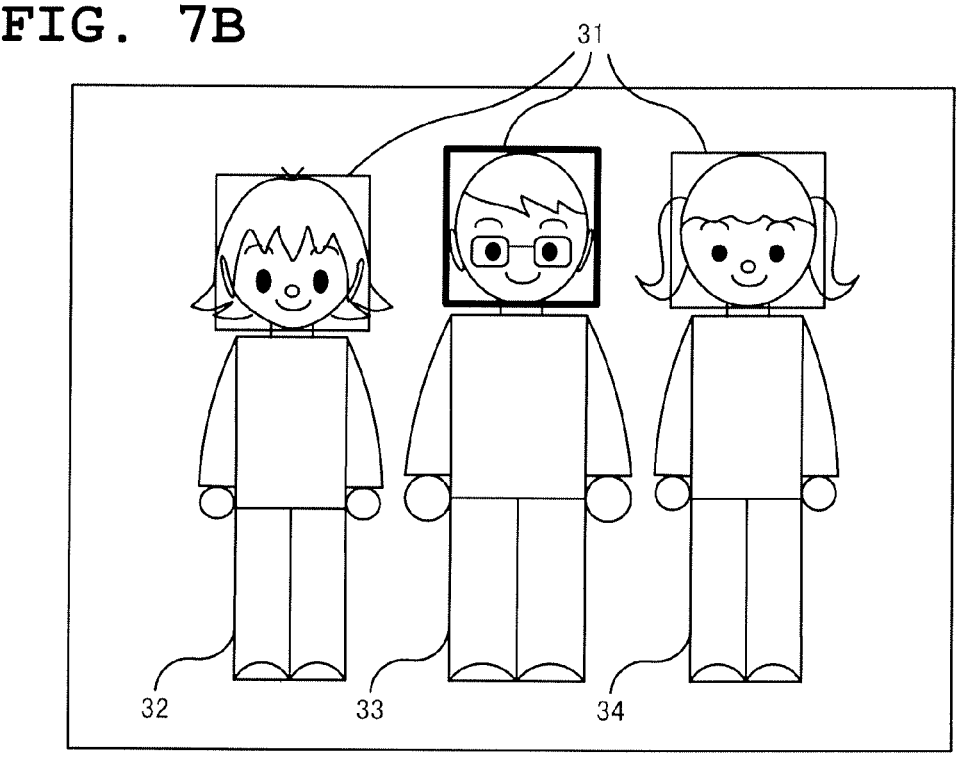

FIG. 7A and FIG. 7B are diagrams showing the face detecting frames that are displayed. FIG. 7A is a diagram showing a face detecting frame 31 that is displayed when a single face has been detected.

It is apparent from FIG. 7A that the face detecting frame 31 is displayed on faces detected in the image displayed (picked up).

This face detecting frame 31 is displayed in a size corresponding to the zone of the detected face. That is, when the zone of the detected face is small, the face detecting frame 31 is displayed in a small size, and when the zone of the detected face is large, the face detecting frame 31 is displayed in a large size.

At subsequent Step S53, the DSP/CPU 19 acquires the photographic subject distance from the photographic subject distance table based on the size of the face detecting frame 31 displayed corresponding to the zone of the detected face (face size) and the zoom magnification it has acquired, and advances to Step S57. The size of the face detecting frame 31 is determined corresponding to the zone of the detected face, and thus the photographic subject distances corresponding to the size of the face detecting frame 31 recorded in the photographic subject distance table and the zoom magnification should be the photographic subject distances recorded corresponding to the size of the detected face and the zoom magnification. This is because the distances from the faces to the photographer (the digital camera 1) differs depending on the size of the detected face and the zoom magnification. For example, in the case where the zoom magnifications are the same, if the photographic subject distance when the size of the face detecting frame 31 is large is compared to the photographic subject distance when the size thereof is small, the photographic subject distance when the size thereof is large should be shorter. In the meantime, in the case where the sizes of the face detecting frames 31 are the same, if the photographic subject distance when the zoom magnification is large is compared to the photographic subject distance when it is small, the photographic subject distance when the zoom magnification is small should be shorter.

In the photographic subject distance table, the individual photographic subject distances are set corresponding to the size of the face detecting frame 31 and the zoom magnification. However, the photographic subject distances may be set corresponding to the size of the face and the zoom magnification. Furthermore, the photographic subject distance is set in the photographic subject distance table in this embodiment. However, the focus positions may be set as in the first embodiment described above.

On the contrary, when judged at Step S51 that multiple faces have been detected, the DSP/CPU 19 advances to Step S54. At Step S54, the DSP/CPU 19 executes main photographic subject identification processing of identifying a face which serves as the main photographic subject among the multiple faces detected. The main photographic subject identification processing will be described later. Briefly, the main photographic subject identification processing identifies the main photographic subject through comprehensive comparison of the distance from the center of the field angle to the face, the area of the face, and face-likeness.

After identifying the main photographic subject through the main photographic subject identification processing, the DSP/CPU 19 advances to Step S55. At Step S55, the DSP/CPU 19 displays the individual face detecting frames 31 based on the zones of the detected faces and distinctly displays the main photographic subject identified by the main photographic subject identification processing. Also in this case, the face detecting frames 31 are displayed in the sizes corresponding to the zones of the detected faces.

FIG. 7B is a diagram showing the face detecting frames that are displayed when multiple faces are detected and the main photographic subject distinctly displayed.

It is apparent from FIG. 7B that the face detecting frames 31 are displayed on the detected multiple faces (a face of a person 32, a face of a person 33 and a face of a person 34) in the displayed (picked-up) image. It is also apparent that the face of the person 33 is identified as the main photographic subject, and the main photographic subject is displayed such that it is differentiated from the other photographic subjects. (That is, the face detecting frame 31 is displayed with the thick frame). In this embodiment, the main photographic subject is distinctly displayed by displaying the face detecting frame 32 with a thick frame. In place of this, the main photographic subject may be distinctly displayed by changing the type of lines (such as dotted line, dashed line), the color or the like of the face detecting frame 31. Alternatively, the information that the photographic subject is the main photographic subject may be displayed separately from the face detecting frame 31.

Subsequently, the DSP/CPU 19 advances to Step S56, where the DSP/CPU 19 acquires the photographic subject distance from the photographic subject distance table based on the size of the face detecting frame 31 displayed corresponding to the zone of the face (the face size) identified as the main photographic subject and the zoom magnification acquired, and advances to Step S57.

When advanced to Step S57, the DSP/CPU 19 acquires the focus position corresponding to the photographic subject distance acquired using a photographic subject distance/focus position conversion table not shown, and moves the focus lens 2a to the focus position acquired. Then, the DSP/CPU 19 advances to Step S15 in FIG. 3.

As described above, the DSP/CPU 19 acquires the photographic subject distance (focus position) based on the size of the detected face and the zoom magnification. Thereby, it is possible to quickly focus on a person with high accuracy, and the possibility that the true photographic subject is focused in the pan focus processing is substantially enhanced.

In addition, when multiple faces have been detected, the DSP/CPU 19 identifies the face which serves as the main photographic subject and acquires the photographic subject distance based on the size of the face identified as the main photographic subject and the zoom magnification. Thereby, it is possible to quickly focus on the main photographic subject with high accuracy, and the possibility that the true photographic subject is focused in the pan focus processing is substantially enhanced.

Next, the operation of the main photographic subject identification processing will be described with reference to a sub-flowchart of FIG. 6B.

Figure 6B:
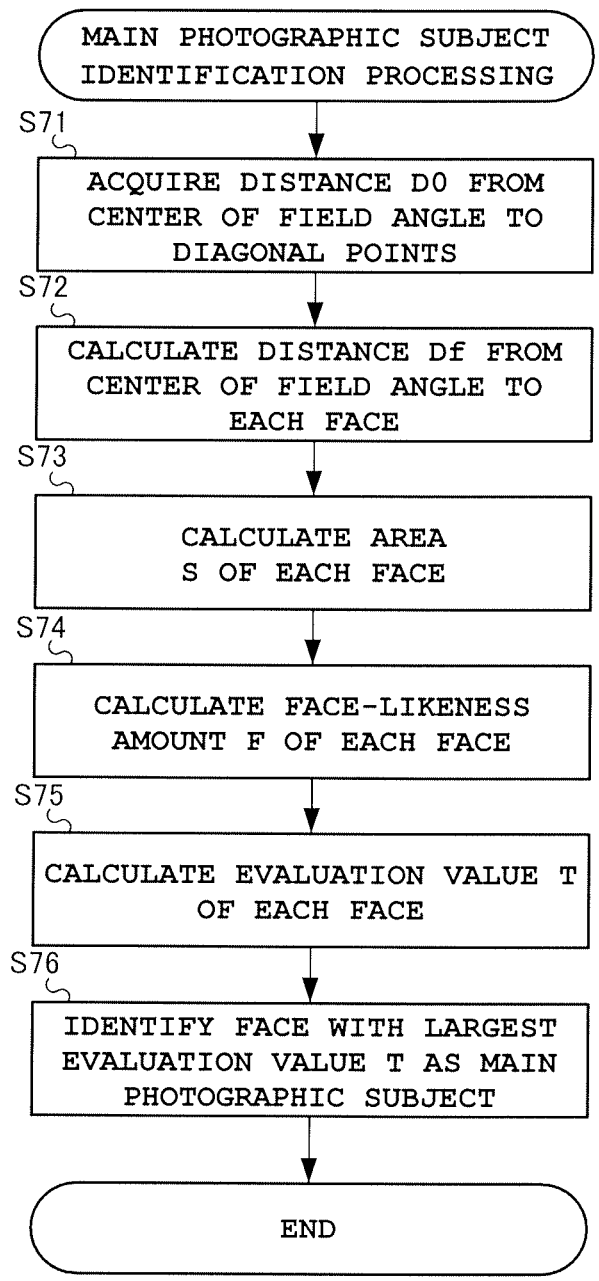
FIG. 6B is a flowchart showing an operation of a main photographic subject identification processing.

When advanced to Step S54 in FIG. 6A, the DSP/CPU 19 advances to Step S71 in FIG. 6B, where the DSP/CPU 19 acquires the distance D0 from the center of the field angle to the diagonal points. This distance D0 from the center of the field angle to the diagonal points is determined depending on the size of the image to be picked up.

At subsequent Step S72, the DSP/CPU 19 calculates the distance Df from the center of the field angle of each detected face.

At subsequent Step S73, the DSP/CPU 19 calculates the area S of the zone of each detected face. Note that, the area S may be an area of the face detecting frame 31 of each face. This is because the face detecting frame 31 has a size corresponding to the zone of the face.

At subsequent Step S74, the DSP/CPU 19 calculates the face-likeness amount F of each detected face. In this embodiment, the DSP/CPU 19 detects a face, for example, through comparison of general character data of a human face (the character data on eyes, eyebrows, nose, mouth, ears and the like) with the image data, and when the face-likeness amount is within a predetermined error range, determines a face as the true face. Therefore, the smaller the error is, the larger the face-likeness amount F should be.

At subsequent Step S75, the DSP/CPU 19 calculates the evaluation value T for each face based on D0, Df, S, F that have been acquired and calculated at Step S71 to Step S74. The calculation can be made using the following calculating formula:

Evaluation value $T=(\alpha-Df/D0)+S\times\beta+F\times\gamma$, where, $\alpha$ is a distance weighing coefficient, $\beta$ is an area weighing coefficient, and $\gamma$ is a face-likeness weighing coefficient.

In this calculation formula, the evaluation value T should be larger, the closer to the center of the field angle the face is, the larger the area of the face is, and the more face-likeness the face has. This is because the photographic subject the photographer desires to shoot tends to be close to the center of the field angle and to be picked up with a larger face. In addition, since a photographic subject with low face-likeness is not likely a face or is likely a face of a photographic subject located far away, the photographic subject can be judged as not the photographic subject the photographer truly desires to shoot.

At subsequent Step S76, the DSP/CPU 19 identifies the face with the highest evaluation value T of all calculated evaluation values T as the main photographic subject, and advances to Step S55 in FIG. 6A.

As described above, when multiple faces are detected, the distance from the center of the field angle to the face, the area of the face, and the face-likeness are compared comprehensively. Thereby, it is possible to quickly identify the face which serves as the main photographic subject, that is, the photographic subject the photographer truly shot from the multiple faces detected, and thus it is possible to quickly focus on the photographic subject the photographer truly shot.

On the contrary, in a conventional art, even when multiple faces are detected, it is not determined which face should be focused, and thus the photographic subject the user truly shot are not identified. Additionally, in a conventional art, the focus processing is executed on one of the detected multiple faces or all detected faces, and thus it is impossible to focus on the photographic subject the user truly desires to shoot.

Alternatively, another approach may also be conceivable, in which the character data on specific faces such as those of the friends or the family members of the user are registered, and when multiple faces are detected, the registered face is identified as the main photographic subject through personal authentication processing, and the focus processing is executed on it. However, as the registration of the faces of the specific persons is required and a long processing time is required for the personal authentication, it is not possible to quickly identify the main photographic subject.

In the present variation example, however, when multiple faces are detected, the main photographic subject is identified through comprehensive comparison of the distance from the center of the angle of field to the face, the area of the face, and the face-likeness so as to quickly and easily focus on the true photographic subject.

Specifically, it is common that the user puts the photographic subject the user truly desires to shoot in the vicinity of the center of the angle of field, and it is not conceivable that the user shoots the true photographic subject with a small size. Therefore, the example variation identifies the main photographic subject verifying the closeness from the center of the angle of field and the face size. In addition, since a photographic subject with low face-likeness is not likely a face or is likely a face of a photographic subject located far away, the variation example also identifies the main photographic subject verifying face-likeness.

C. The Second Embodiment

The second embodiment will hereinafter be described.

In the first embodiment, the pan focus processing is executed when the pan focus shooting mode is set by the user. In the second embodiment, however, the pan focus processing is executed when the shutter button is fully depressed without stopping in the auto focus shooting mode. In the case where the shutter button has been fully depressed without stopping, it is likely that the user truly desires to shoot. Accordingly, the pan focus processing is executed to reduce the focus processing time.

[The Operation of the Digital Camera 1]

The second embodiment realizes the imaging apparatus according to the present invention also through use of the digital camera 1 having a similar structure as the structure shown in FIG. 1. In the second embodiment, the optical zoom is used to execute the zoom processing.

The operation of a digital camera 1 according to a second embodiment will hereinafter be described with reference to the flowchart of FIG. 8 to FIG. 10.

When the auto focus shooting mode is set by user operation of the mode selection key in the key input section 20, the DSP/CPU 19 starts imaging a photographic subject using the CCD 7, and executes the AE processing with a focal length corresponding to the lens position of the current zoom lens 2b. the DSP/CPU 19 also starts the processing on the images such as the white balance processing in the color process circuit 10 (Step S101).

Next, the DSP/CPU 19 sets exposure, white balance and the like, and then starts a so called through image display. In the through image display, after storing an image data picked up by the CCD 7 in the DRAM 13, the DSP/CPU 19 stores the stored image data in the VRAM 15, and display the image data picked up in the image display section 17 via the digital video encoder 16 (Step S102).

Next, at Step S103, the DSP/CPU 19 starts the face detecting processing of sequentially detecting whether a face of a human is present in the picked-up image data. As explained in the above-described first embodiment, the face detecting processing detects a face which proportion to the whole picked-up image is not less than 10% in size.

At subsequent Step S104, the DSP/CPU 19 starts the processing of overlapping the face detecting frame 31 on the detected face in the through image. In the display processing, it should be understood that when a face is detected, the face detecting frame 31 is displayed based on the zone of the detected face, and when a face is not detected, the face detecting frame 31 is not displayed. As explained in the above-described variation example of the first embodiment, the face detecting frame 31 is displayed in the size corresponding to the zone of the detected face.

Subsequently, the DSP/CPU 19 judges at Step S105 whether the zoom operation has been performed by the user.

When judged at Step S105 that the zoom operation has been performed, the DSP/CPU 19 advances to Step S106. At Step S106, the DSP/CPU 19 executes the zoom processing in accordance with the operation, and advances to Step S107.

On the other hand, when judged at Step S105 that the zoom operation has not been performed, the DSP/CPU 19 advances to Step S107 without executing any further processing.

When advanced to Step S107, the DSP/CPU 19 judges whether multiple faces have been detected by the face detecting processing.

When judged at Step S107 that multiple faces have been detected, the DSP/CPU 19 advances to Step S108. At Step S108, the DSP/CPU 19 executes the main photographic subject identification processing of identifying the face which serves as the main photographic subject among the detected multiple faces. As explained in the above-described first embodiment, the main photographic subject identification processing executes the operation as shown in the flowchart of FIG. 6B.

At subsequent Step S109, the DSP/CPU 19 distinctly displays the face of the identified main photographic subject, and advances to Step S110. In this embodiment, as shown in FIG. 7B, the DSP/CPU 19 distinctly displays the face by displaying the face detecting frame 31 with a thick frame. However, it should be understood that the face may be distinctly displayed in other methods.

On the contrary, when judged that multiple faces have not been detected at Step S107 (including when no face has been detected), the DSP/CPU 19 advances to Step S110 without executing any further processing.

When advanced to Step S110, the DSP/CPU 19 judges whether the shutter button has been half depressed by the user.

When judged at Step S110 that the shutter button has not been half depressed, the DSP/CPU 19 returns to Step S105. On the other hand, when judged at Step S110 that the shutter button has been half depressed, the DSP/CPU 19 advances to Step S111. At Step S111, the DSP/CPU 19 determines and locks the photographic conditions such as the exposure values (the aperture value, the shutter speed and the amplification factor), the white balance value and the like for the present shooting based on the through image acquired immediately before the half depression of the shutter button. At the same time, the DSP/CPU 19 judges which mode, among the compulsory flash mode, the auto-strobe mode and the flash disable mode, the strobe mode is in. When the strobe mode is the auto-strobe mode, the DSP/CPU 19 further judges whether a luminance component of a signal outputted from the CCD 7 (that is, the through image acquired immediately before the half depression of the shutter button) or the image picked up by a photometric circuit not shown is dark. Then, after judging whether to flash a strobe, the DSP/CPU 19 locks the photographic conditions such as strobe flash ON/OFF.

Subsequently, the DSP/CPU 19 judges at Step S112 whether a face has been detected immediately before the half depression of the shutter button.

When judged at Step S112 that a face has been detected, the DSP/CPU 19 advances to Step S113, where the DSP/CPU 19 judges whether multiple faces have been detected.

When judged at Step S113 that multiple faces have been detected, the DSP/CPU 19 advances to Step S114. At Step S114, the DSP/CPU 19 sets the AF area at the position of the face identified as the main photographic subject immediately before the half depression of the shutter button, and after starting the AF processing according to the contrast detection method based on the image data of the AF area set, advances to Step S117 in FIG. 9.

The AF processing according to the contrast detection method refers to the AF processing as follows: A control signal is sent to the motor driver circuit 3 so that the search movement of the focus lens 2a from one lens end to the other lens end is performed within a range in which the lens can be driven, and when the lens position at which the contrast of the image data in the AF area has a peak value is detected, the search movement is completed and the focus lens 2a is moved to the detected lens position with the peak contrast for focusing.

On the contrary, when judged at Step S113 that multiple faces have not been detected, that is, when judged that a single face has been detected, the DSP/CPU 19 advances to Step S115. At Step S115, the DSP/CPU 19 sets the AF area at the position of the detected face, and after starting the AF processing according to the contrast detection method based on the image data set, advances to Step S117 in FIG. 9.

On the contrary, when judged at Step S112 that a face has been detected, the DSP/CPU 19 advances to Step S116. At Step S116, the DSP/CPU 19 sets the AF area at the center of the field angle, and after starting the AF processing according to the contrast detection method based on the image data of the AF area set, advances to Step S117 in FIG. 9.

When advanced to Step S117, the DSP/CPU 19 judges whether the AF processing has been completed. It should be understood that the AF processing is judged to be completed when the focus lens 2a has been moved to the lens position at which the detected contrast has a peak value, and when the lens position at which a contrast has a peak value has not been detected and the search movement of the focus lens 2a from one lens end to the other lens end has been completed.

When judged at Step S117 that the AF processing has not been completed, the DSP/CPU 19 advances to Step S118, where the DSP/CPU 19 judges whether the shutter button has been fully depressed by the user.

When judged at Step S118 that the shutter button has not been fully depressed, the DSP/CPU 19 returns to Step S117.

On the other hand, when judged at Step S118 that the shutter button has been fully depressed before the judging at Step S117 that the AF processing has been completed, the DSP/CPU 19 judges that the user is requesting the quick shooting, and advances to Step S119 to judge whether to execute the pan focus processing. The cases where the shutter button is fully depressed before the AF processing is completed includes the case where the shutter button has been fully depressed without stopping by the user, and the like.

The AF processing continues even when advanced to Step S119.

When advanced to Step S119, the DSP/CPU 19 acquires the zoom magnification for the present optical zoom.

Subsequently, the DSP/CPU 19 judges at Step S120 whether the zoom magnification for the present optical zoom acquired is within the range from 1-fold (that is, the magnification on the Wide side) to a predetermined magnification.

When judged at Step S120 that the present zoom magnification is not within the range from 1-fold to a predetermined magnification, that is, when judged that the present zoom magnification is larger than a predetermined magnification, the DSP/CPU 19 advances to Step S121. At Step S121, the DSP/CPU 19 judges whether the AF processing has been completed. When judged that the AF processing has not been completed, the DSP/CPU 19 remains at Step S121 until judged that the AF has been completed.

When the shutter button has been fully depressed before the completion of the AF processing, the DSP/CPU 19 executes the AF processing without executing the pan focus processing although the quick shooting is being requested. This is because, when the zoom magnification of the optical zoom is larger than a predetermined magnification, the depth of field is reduced, and the photographic subject is likely to be out of focus if the pan focus processing is executed. Therefore, when the zoom magnification is larger than a predetermined magnification, shooting is suspended until the AF processing is completed although it takes a long time for the focus processing. As a result of this, it is possible to focus on the true photographic subject appropriately.

When judged at Step S121 that the AF processing has been completed, the DSP/CPU 19 advances to Step S122, where the DSP/CPU judges whether the AF processing has failed. The AF processing is judged as the failure in the case where the DSP/CPU 19 fails to detect the lens position where the contrast has a peak value before the search movement from one lens end to the other lens end of the focus lens 2a is completed. That is, the DSP/CPU 19 judges as the failure in the case where the DSP/CPU 19 fails to detect the focusing lens position.

When judged at Step S122 that the AF processing has not failed, the DSP/CPU 19 advances to Step S129. At Step S129, the DSP/CPU 19 executes the still image shooting processing under the photographic conditions locked at Step S111, and records the still image data compressed by the JPEG circuit 18 in the flash memory 24.

On the other hand, when judged at Step S122 that the AF processing has failed, the DSP/CPU 19 advances to Step S123 to move to the pan focus processing.

In the meantime, when judged at Step S120 that the present zoom magnification is within the range from 1-fold to a predetermined magnification, the DSP/CPU 19 advances to Step S123 to move to the pan focus processing. At this time, the DSP/CPU 19 may forcibly terminate the AF processing according to the contrast detection method.

When advanced to Step S123, the DSP/CPU 19 judges whether a face has been detected immediately before the half depression of the shutter button.

When judged at Step S123 that a face has been detected, the DSP/CPU 19 advances to Step S124, where the DSP/CPU 19 determines the type of the priority pan focus as the person-priority pan focus. As a result of this, the DSP/CPU 19 acquires a focus position for the pan focus using the focus position table shown in FIG. 2A.

Next, when determined that the type of the priority pan focus is the person-priority pan focus, the DSP/CPU 19 advances to Step S125. At Step S125, the DSP/CPU 19 acquires a focus position for prioritizing a person from the focus position table shown in FIG. 2A based on the zoom magnification acquired at Step S119, and advances to Step S128.

On the other hand, when judged at Step S123 that a face has been detected, the DSP/CPU 19 advances to Step S126, where the DSP/CPU 19 executes the determination processing of the type of the priority pan focus based on the photography scene. In the determination processing, the DSP/CPU 19 performs the operation as shown in the flowchart of FIG. 4, as explained in the above-described first embodiment.

Next, after determining the type of the priority pan focus based on the photography scene, the DSP/CPU 19 advances to Step S127. At Step S127, the DSP/CPU 19 acquires the focus position for the pan focus from the focus position table shown in FIG. 2B based on the type of the priority pan focus determined by the determination processing and the zoom magnification acquired at Step S119, and advances to Step S128.

When advanced to Step S128, the DSP/CPU 19 sends a control signal to the motor driver circuit 3 to move the focus lens 2a to the pan focus position acquired.

Next, at Step S129, the DSP/CPU 19 executes the still image shooting processing under the photographic conditions locked at Step S111, and records the still image data compressed by the JPEG circuit 18 in the flash memory 24.

Figure 10:
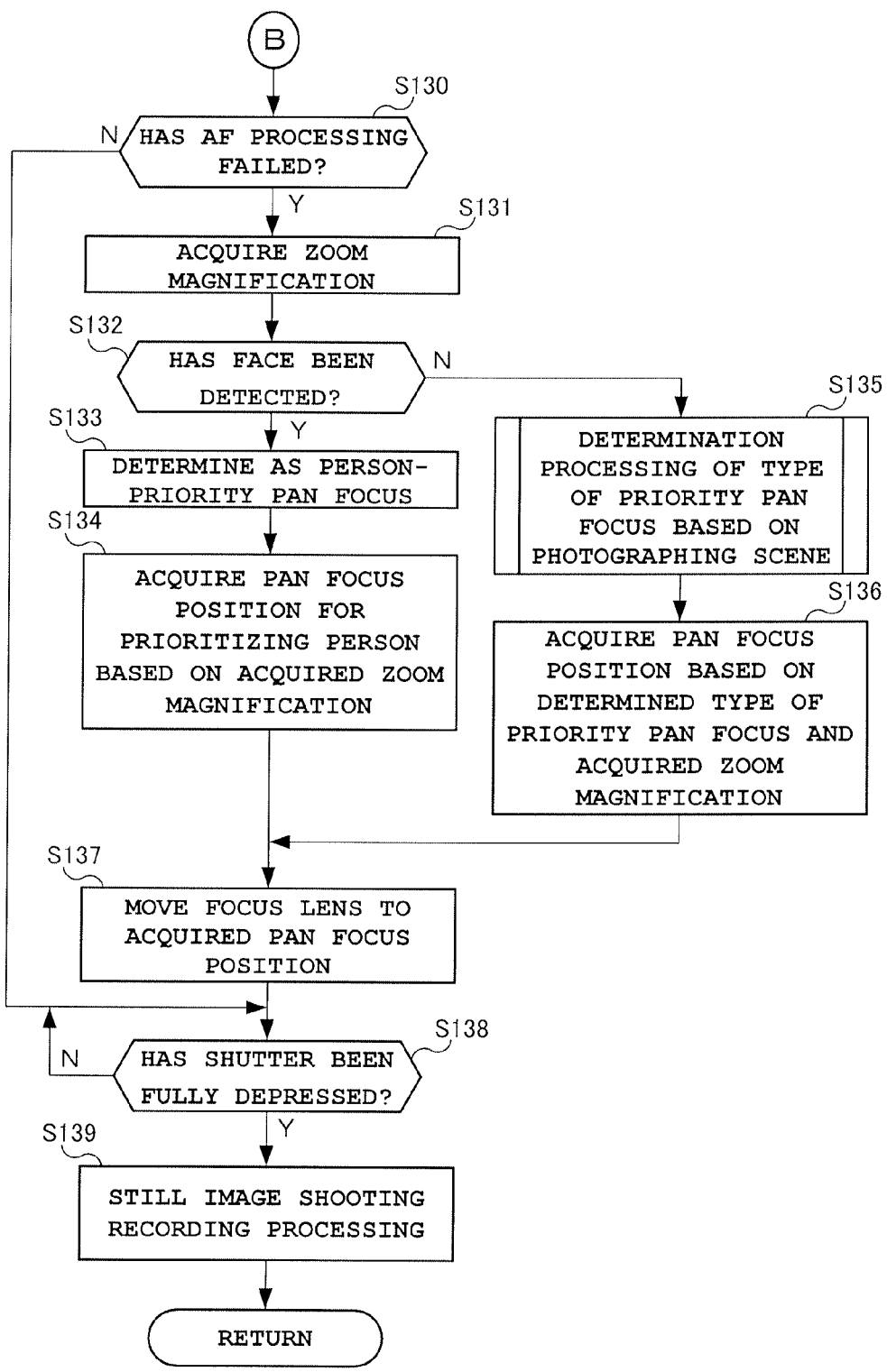
FIG. 10 is a flowchart showing an operation of a digital camera according to the second embodiment.

On the contrary, when judged at Step S117 that the AF processing has been completed before the full depression of the shutter button at Step S118, the DSP/CPU 19 advances to Step S130 in FIG. 10. At Step S130, the DSP/CPU 19 judges whether the AF processing has failed.

When judged at Step S130 that the AF processing has failed, the DSP/CPU 19 advances to Step S131, where the DSP/CPU 19 acquires the zoom magnification for the present optical zoom.

Subsequently, the DSP/CPU 19 judges at Step S132 whether a face has been detected immediately before the half depression of the shutter button.

When judged at Step S132 that a face has been detected, the DSP/CPU 19 advances to Step S133, where the DSP/CPU 19 determines the type of the priority pan focus as the person-priority pan focus. As a result of this, the DSP/CPU 19 acquires the focus position for the pan focus, using the focus position table shown in FIG. 2A.

Next, when determined that the type of the priority pan focus is the person-priority pan focus, the DSP/CPU 19 advances to Step S134. At Step S134, the DSP/CPU 19 acquires the focus position for prioritizing a person from the focus position table shown in FIG. 2A based on the zoom magnification acquired at Step S131, and advances to Step S137.

On the other hand, when judged at Step S132 that a face has not been detected, the DSP/CPU 19 advances to Step S135. At Step S135, the DSP/CPU 19 executes the determination processing of the type of the priority pan focus based on the photography scene. As explained in the above-described first embodiment, the determination processing performs the operation as shown in the flowchart of FIG. 4.

Next, after determining the type of the priority pan focus based on the photography scene, the DSP/CPU 19 advances to Step S136. At Step S136, the DSP/CPU 19 acquires the focus position for the pan focus from the focus position table shown in FIG. 2B based on the type of the priority pan focus determined by the determination processing and the zoom magnification acquired at Step S131, and advances to Step S137.

When advanced to Step S137, the DSP/CPU 19 sends a control signal to the motor driver circuit 3 to move the focus lens 2a to the pan focus position acquired, and advances to Step S138.

In the mean time, when judged at Step S130 that the AF processing has not failed, the DSP/CPU 19 advances to Step S138 without executing any further processing.

When advanced to Step S138, the DSP/CPU 19 judges whether the shutter button has been fully depressed by the user.

When judged at Step S138 that the shutter button has not been fully depressed, the DSP/CPU 19 remains at Step S138 until the shutter button is fully depressed. Then, when judged that the shutter button has been fully depressed, the DSP/CPU 19 advances to Step S139. At Step S139, the DSP/CPU 19 executes the still image shooting processing under the photographic conditions locked at Step S111, and records the still image data compressed by the JPEG circuit 18 in the flash memory 24.

As described so far above, in the second embodiment, when the user is requesting the quick shooting, for example, when a face has been detected in the case where the shutter button has been fully depressed without stopping, the DSP/CPU 19 determines that the photographic subject the user truly desires to shoot is a person, and executes the pan focus processing using the focus position table for person-priority pan focus (that is, the focus position table as shown in FIG. 2A). On the other hand, when a face has not been detected, the DSP/CPU 19 judges that the true photographic subject the photographer desires to shoot is a photographic subject other than a person such as a landscape, and executes the pan focus processing using the focus position table for non-person priority pan focus (that is, the focus position table as shown in FIG. 2B). Accordingly, it is possible to focus appropriately and quickly corresponding to the photographic subject to shoot. In addition, it is possible to substantially enhance the possibility that the true photographic subject is focused in the pan focus processing.

Furthermore, when a face has been detected in the case where the quick shooting is not requested by the user, the DSP/CPU 19 executes the auto-focus processing on the face. On the other hand, when a face has not been detected, the DSP/CPU 19 executes the auto-focus processing on the center of the angle of field. Accordingly, it is possible to focus on the photographic subject the user truly desires to shoot with high accuracy.

Furthermore, even in the case, when the optical zoom magnification is larger than a predetermined magnification, where the shutter button has been fully depressed without stopping, the depth of field is reduced. The photographic subject is likely to be out of focus if the pan focus processing is executed in such cases. Executing the auto-focus processing enables focusing on the photographic subject the user truly desires to shoot with high accuracy.

Furthermore, when the auto-focus processing has failed, the focusing lens position is not detected. Executing the pan focus processing based on whether or not a face has been detected and on the photography scene enables appropriately focusing on the true photographic subject the photographer desires to shoot.

D. Variation Example 1 of the Second Embodiment

The following variation example of the second embodiment as described above is possible.

In the second embodiment described above, when determined that the type of the priority pan focus is the person-priority pan focus, the DSP/CPU 19 acquires the focus position corresponding only to the zoom magnification from the focus position table for person-priority pan focus. In the present variation example, however, the focus position is changed based on the size of the detected face or the like, as explained in the above-described variation example of the first embodiment.

As explained in the above-described variation example of the first embodiment, in place of the focus position table shown in FIG. 2A, the photographic subject distance table as shown in FIG. 5 has been recorded in the present variation example.

The operation of the present variation example will hereinafter be described with reference to the flowchart of FIG. 11.

Figure 9:
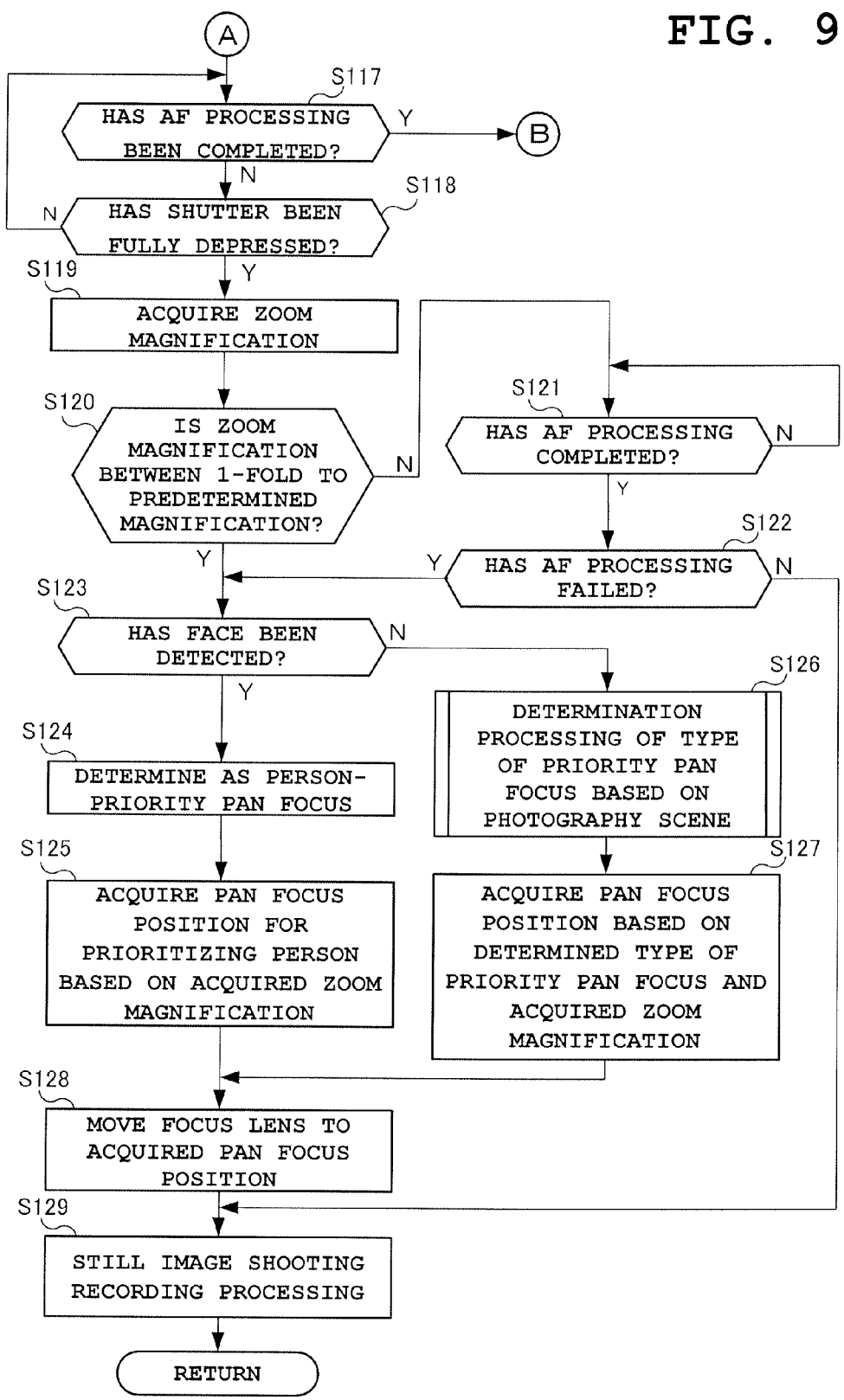
FIG. 9 is a flowchart showing an operation of a digital camera according to the second embodiment.
Figure 11:
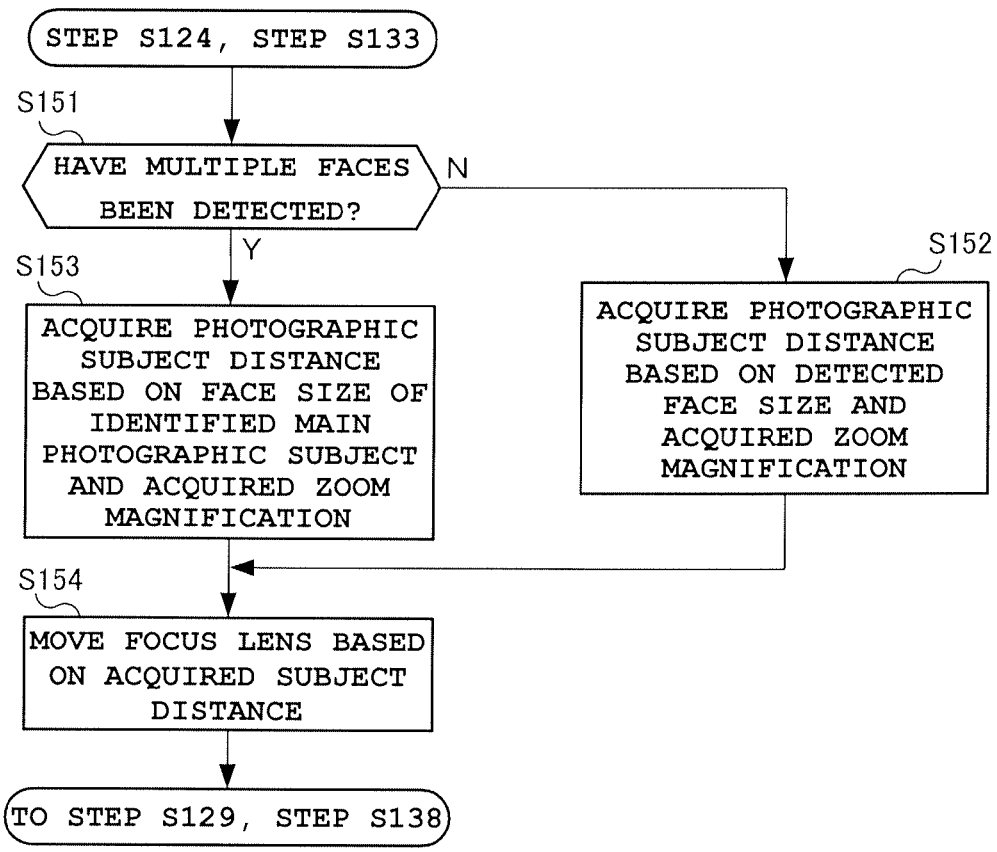
FIG. 11 is a flowchart showing an operation of a variation example 1 of the second embodiment.

When determined that the type of the priority pan focus is the person-priority pan focus at Step S124 in FIG. 9 or at Step S133 in FIG. 10, the DSP/CPU 19 advances to Step S151 in FIG. 11. At Step S151, the DSP/CPU 19 judges whether multiple faces have been detected immediately before the half depression of the shutter button.

When judged at Step S151 that multiple faces have not been detected, that is, when judged that a single face has been detected, the DSP/CPU 19 advances to Step S152. At Step S152, the DSP/CPU 19 acquires the photographic subject distance from the photographic subject distance table based on the size of the face detecting frame 31 displayed corresponding to the zone of the detected face (the face size) and the zoom magnification acquired, and advances to Step S154.

Note that the individual photographic subject distances are set corresponding to the size of the face detecting frame 31 and the zoom magnification in the photographic subject distance table. In place of this, the photographic subject distances may be set corresponding to the size of the face and the zoom magnification. In addition, the photographic subject distance is set in this embodiment. It should be understood that the focus position may be set in place of this.

On the other hand, when judged at Step S151 that multiple faces have been detected, the DSP/CPU 19 advances to Step S153. At Step S153, the DSP/CPU 19 acquires the photographic subject distance from the photographic subject distance table based on the size of the face detecting frame 31 displayed corresponding to the zone of the face (the face size) identified as the main photographic subject immediately before the half depression of the shutter button and the zoom magnification acquired, and advances to Step S154.

When advanced to Step S154, the DSP/CPU 19 acquires the focus position corresponding to the photographic subject distance acquired using the photographic subject distance/focus position conversion table not shown, and after moving the focus lens 2a to the focus position acquired, advances to Step S129 in FIG. 9 and Step S138 in FIG. 10.

As described above, the photographic subject distance (the focus position) is acquired based on the size of the detected face and the zoom magnification. Accordingly, it is possible to quickly focus on a person with high accuracy. In addition, it is possible to substantially enhance the possibility that the true photographic subject is focused in the pan focus processing.

Furthermore, when multiple faces have been detected, the DSP/CPU 19 identifies the face which serves as the main photographic subject, and acquires the photographic subject distance based on the size of the face identified as the main photographic subject and the zoom magnification. Accordingly, it is possible to quickly focus on a main photographic subject with high accuracy. In addition, it is possible to substantially enhance the possibility that the true photographic subject is focused in the pan focus processing.

E. Variation Example 2 of the Second Embodiment

In the second embodiment as described above, the optical zoom is used to execute the zoom processing. Instead, both the optical zoom and the electrical zoom may be used to execute the zoom processing. In this embodiment, the judgment at Step S120 in FIG. 9 is made based on whether the zoom magnification in the optical zoom is larger than a predetermined magnification.

Furthermore, in place of the optical zoom, the electronic zoom, in place of the optical zoom, may be used to execute the zoom processing. In this case, when judged at Step S118 in FIG. 9 that the shutter button has been fully depressed, the DSP/CPU completes the AF processing according to the contrast detection method, and after acquiring the electronic zoom magnification at Step S119, subsequently advances to Step S123 without executing any further processing.

F. Variation Example 3 of the Second Embodiment

Figure 8:
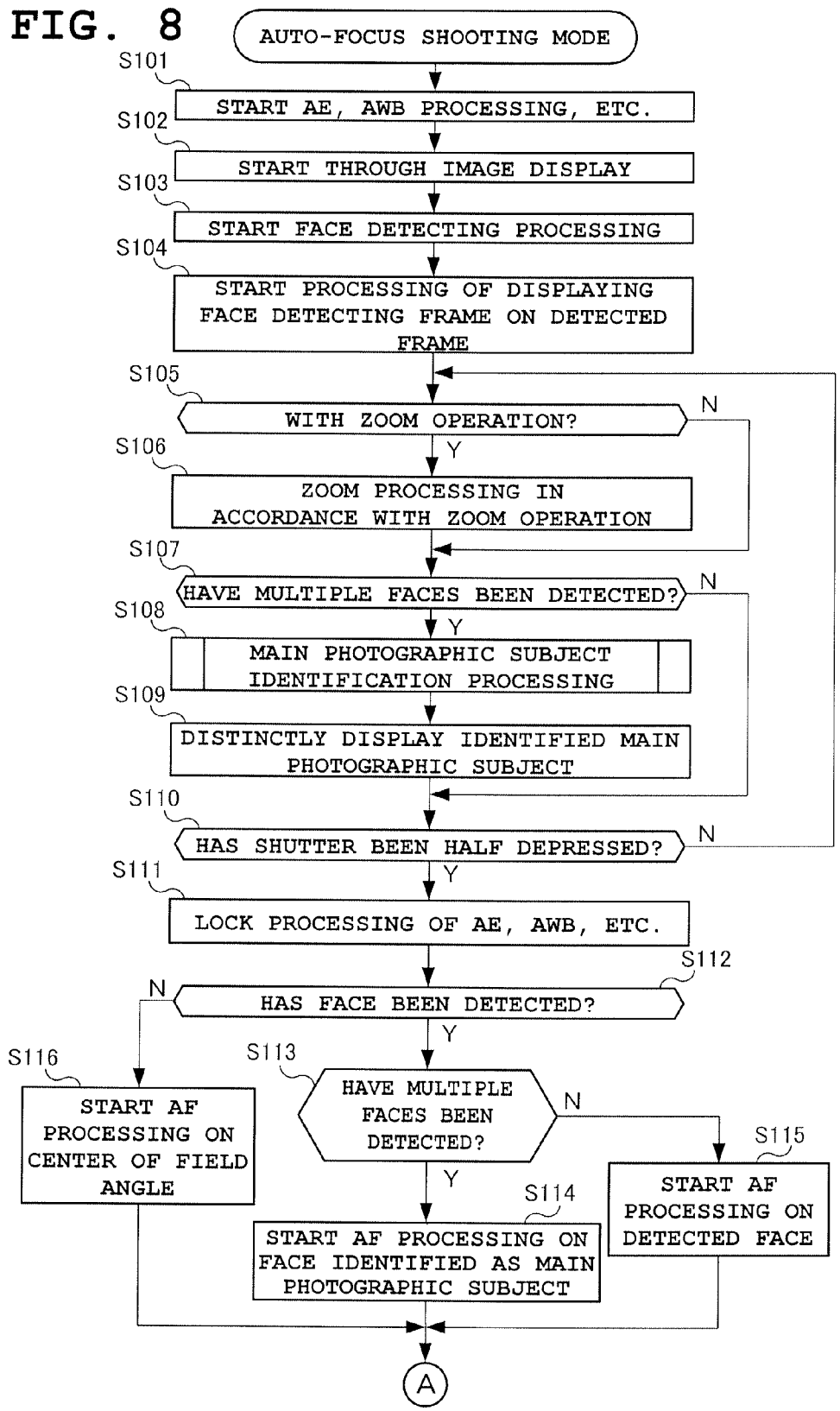
FIG. 8 is a flowchart showing an operation of a digital camera according to a second embodiment.

In the second embodiment, the DSP/CPU 19 should start the AF processing when the shutter button is half depressed, (Step S114 to Step S116 in FIG. 8). On the other hand, when the shutter button has been fully depressed before the AF processing is completed (branched into Y at Step S118), the DSP/CPU 19 judges that the shutter button has been fully depressed without stopping, that is, that the user is requesting the quick shooting. However, the judgment on whether the shutter button has been fully depressed without stopping may be made according to the following operation.

First, the judgment on whether the first shutter button has been fully depressed without stopping will be described with reference to the flowchart shown in FIG. 12.

Figure 12:
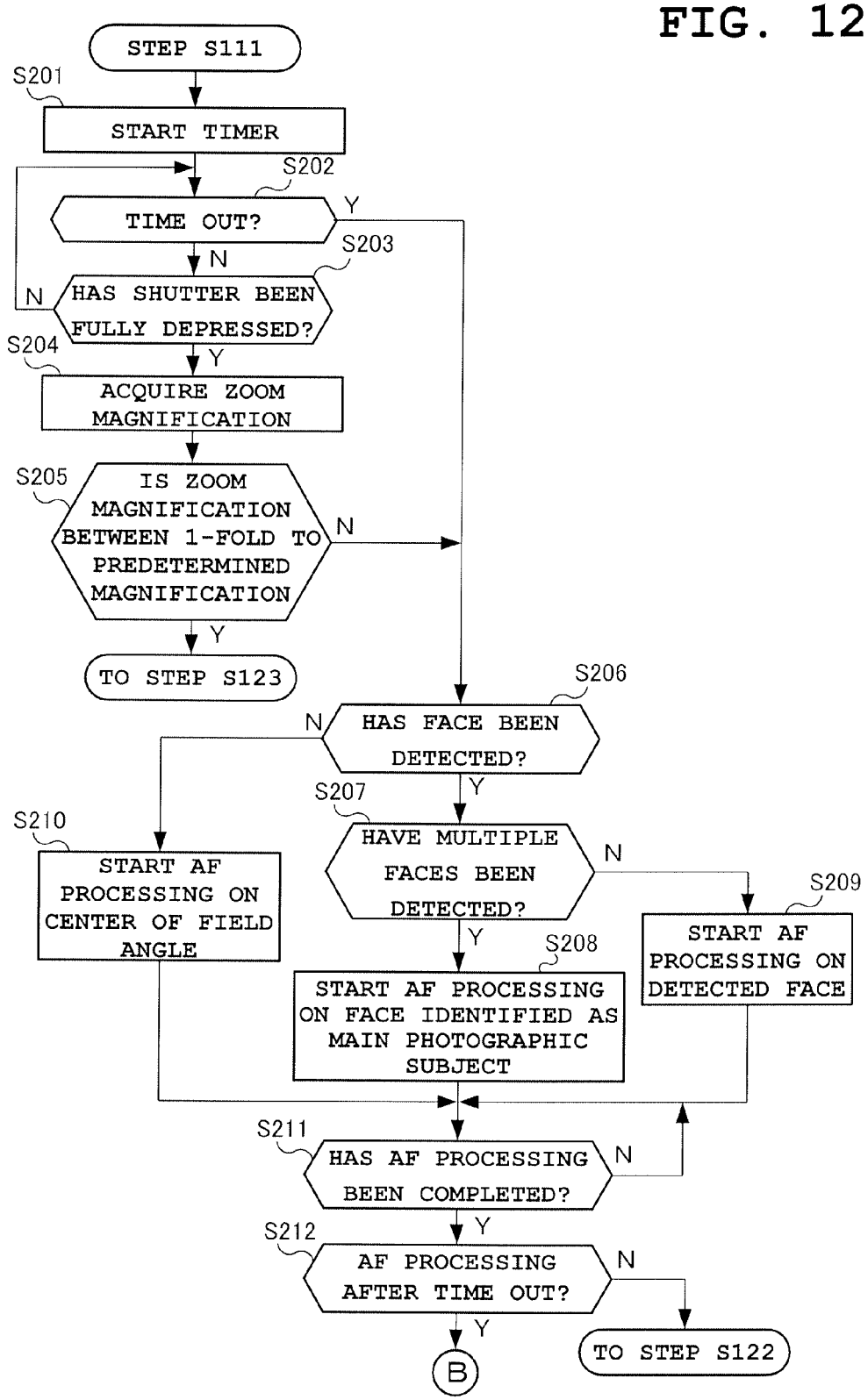
FIG. 12 is a flowchart showing an operation of a variation example 3 of the second embodiment.

When the shutter button is half depressed at Step S110 in FIG. 8, and AE, AWB or the like are locked at Step S111, the DSP/CPU 19 advances to Step S201 in FIG. 12, where the DSP/CPU 19 starts the timer. In the mean time, the DSP/CPU 19, which includes the clock circuit, also has a function as the timer.

Subsequently, the DSP/CPU 19 judges at Step S202 whether time is out. This judgment is made based on whether the timer has passed a predetermined period of time (for example, 0.05 second).

When judged at Step S202 that time is not out, that is, that the timer has not passed a predetermined period of time, the DSP/CPU 19 advances to Step S203. At Step S203, the DSP/CPU 19 judges whether the shutter button has been fully depressed by the user.

When judged at Step S203 that the shutter button has not been fully depressed, the DSP/CPU 19 returns to Step S202.

On the other hand, when judged at Step S203 that the shutter button has been fully depressed before a predetermined period of time has passed, the DSP/CPU 19 judges that the shutter button has been fully depressed without stopping, and thus advances to Step S204. At Step S204, the DSP/CPU 19 acquires the zoom magnification for the present optical zoom.

Subsequently, the DSP/CPU 19 judges at Step S205 whether the zoom magnification of the optical zoom is within a range from 1-fold to a predetermined magnification.

When judged at Step S205 that the zoom magnification of the optical zoom is within a range from 1-fold to a predetermined magnification, the DSP/CPU 19 advances to Step S123 in FIG. 9. As a result of this, the pan focus processing is executed corresponding to whether or not a face has been detected.

On the other hand, when judged at Step S202 that time is out before the shutter button is fully depressed, the DSP/CPU 19 judges that the shutter button has been half depressed rather than fully depressed without stopping, and advances to Step S206. In addition, the DSP/CPU 19 advances to Step S206 also when judged at Step S205 that the zoom magnification of the optical zoom is not within a range from 1-fold to a predetermined magnification. The reason for this is the same as that explained in the second embodiment as described above.

When advanced to Step S206, the DSP/CPU 19 judges whether a face has been detected immediately before the half depression of the shutter button.

When judged at Step S206 that a face has been detected, the DSP/CPU 19 advances to Step S207. At Step S207, the DSP/CPU 19 judges whether multiple faces have been detected.

When judged at Step S207 that multiple faces have been detected, the DSP/CPU 19 advances to Step S208. At Step S208, the DSP/CPU 19 sets the AF area at the position of the face identified as the main photographic subject immediately before the half depression of the shutter button, and after staring the AF processing according to the contrast detection method based on the image data of the AF area it has set, advances to Step S211.

On the other hand, when judged that multiple faces have not been detected at Step S207, that is, when judged that a single face has been detected, the DSP/CPU 19 advances to Step S209. At Step S209, the DSP/CPU 19 sets the AF area at the position of the detected face, and after staring the AF processing according to the contrast detection method based on the image data of the AF area it has set, advances to Step S211.

On the contrary, when judged at Step S206 that a face has been detected, the DSP/CPU 19 advances to Step S210. At Step S210, the DSP/CPU 19 sets the AF area at the center of the field angle, and after staring the AF processing according to the contrast detection method based on the image data of the AF area it has set, advances to Step S211.

When advanced to Step S211, the DSP/CPU 19 judges whether the AF processing has been completed.

When judged at Step S211 that the AF processing has not been completed, the DSP/CPU 19 remains at Step S211 until judged that AF processing has been completed. Then, when judged that the AF processing has been completed, the DSP/CPU 19 advances to Step S212. At Step S212, the DSP/CPU 19 judges at Step S202 whether the AF processing has been executed after time out.

When judged at Step S211 that the AF processing has been executed after time out, the DSP/CPU 19 advances to Step S130 in FIG. 10.

On the other hand, when judged at Step S211 that the AF processing has been executed after time out, in other words, that the DSP/CPU 19 has executed the AF processing at Step S205 after judging that the zoom magnification is not within a range from 1-fold to a predetermined magnification, the DSP/CPU 19 advances to Step S122 in FIG. 9.

Next, the judgment on whether the second shutter button has been fully depressed without stopping will be described with reference to the flowchart shown in FIG. 13.

Figure 13:
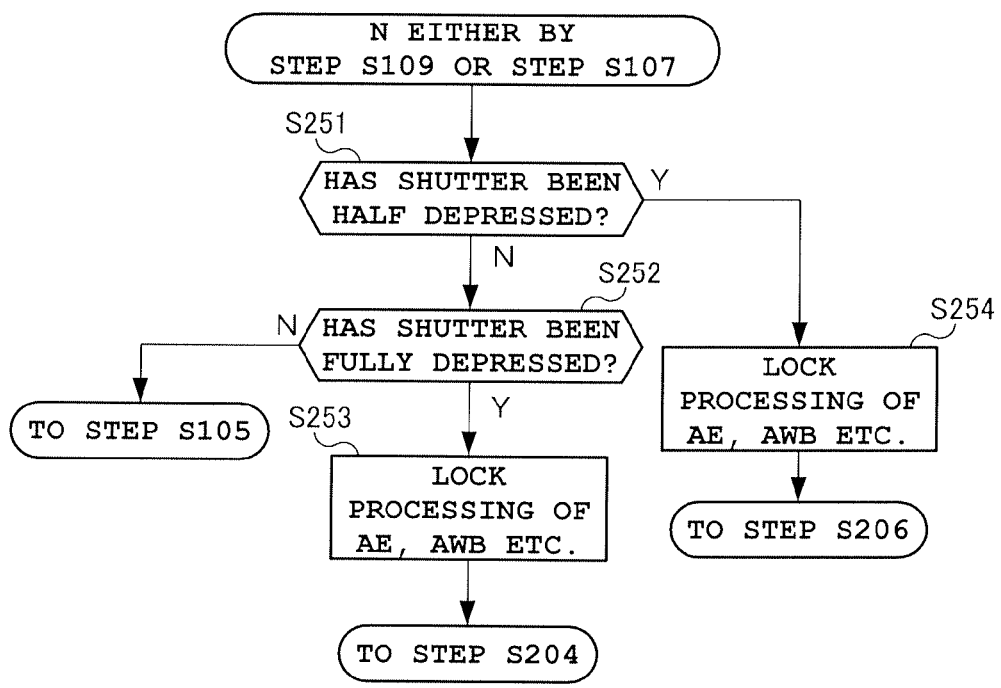
FIG. 13 is a flowchart showing an operation of a variation example 3 of the second embodiment.

The operations in the flowchart of FIG. 13 refers to the operations for judging whether the shutter button has been fully depressed without stopping, in the case where it is set such that an operational signal corresponding to a half depression of the shutter button is not detected unless the half-depression state of the shutter button is maintained for at least a predetermined period of time.

The flowchart of FIG. 13 is created by partially modifying the flowchart of FIG. 12, and it will be explained referring to the operations shown in the flowchart of FIG. 12.

When the face of the main photographic subject identified at Step S109 in FIG. 8 is distinctly displayed, or when judged at Step S107 that multiple faces have not been detected, the DSP/CPU 19 advances to Step S251 in FIG. 13. At Step S251, the DSP/CPU 19 judges whether the shutter button has been half depressed by the user.

When judged at Step S251 that the shutter button has not been half depressed, the DSP/CPU 19 advances to Step S252. At Step S252, the DSP/CPU 19 judges whether the shutter button has been fully depressed by the user.

When judged at Step S252 that the shutter button has not been fully depressed, the DSP/CPU 19 returns to Step S105 in FIG. 8.

On the other hand, at Step S252, when judged that the shutter button has been, not half depressed, but fully depressed, the DSP/CPU 19 advances to Step S253. At Step S253, the DSP/CPU 19 locks the photographic conditions such as the exposure value, the white balance value, and strobe flash ON/OFF, and advances to Step S204 in FIG. 12.

On the other hand, when judged at Step S251 that the shutter button has been half depressed, the DSP/CPU 19 judges that the shutter button has been, not fully depressed without stopping, but half depressed, and advances to Step S254. At Step S254, the DSP/CPU 19 locks the photographic conditions such as the exposure value, the white balance value, and the strobe flash ON/OFF, and advances to Step S206 in FIG. 12.

At this time, the judgment at Step S212 in FIG. 12 is made on whether the AF processing is executed after the shutter button is half depressed. When judged at Step S211 that the AF processing is executed after the half depression of the shutter button, the DSP/CPU 19 advances to Step S130 in FIG. 10. On the other hand, when judged that the AF processing is executed after the full depression of the shutter button, the DSP/CPU 19 advances to Step S122 in FIG. 9.

In this embodiment, the shutter button is a button having a 2-stage stroke enabling the half-depression operation and the full-depression operation. However, the button may be a button enabling the operation of only one stage. (a button that does not have a 2-stage stroke, that is, a button that enables depression only). In this case, a touch sensor for detecting if a finger touches the touch sensor is provided at the upper section of the shutter button. The DSP/CPU 19 judges that the shutter button has been half depressed when a finger touches the touch sensor, and judges that the shutter button has been fully depressed when the shutter button is pressed down.

G. Variation Example 4 of the Second Embodiment

In the second embodiment as described above, in the case where the shutter button has been fully depressed without stopping, when a face has been detected, the DSP/CPU 19 determines that the type of the priority pan focus is the person-priority pan focus and execute the pan focus processing at Steps S124, S125, S128 in FIG. 9, or Step S151 to Step S154 in FIG. 11). On the other hand, when judged that a face has not been detected, the DSP/CPU 19 determines that the type of the priority pan focus is the non-person priority pan focus, and executes the pan focus processing (Steps S126, S127, S128 in FIG. 9). However, when a face has not been detected, the auto-focus processing may be executed, or no focus processing may or need be executed. In this case, it is possible to provide a person shooting mode, and to execute the focus processing when the person shooting mode has been set.

In this case also, when the shutter button has been fully depressed without stopping, it is possible to quickly and appropriately execute the pan focus processing on the person who serves as the true photographic subject. In addition, it is possible to substantially enhance the possibility that the photographic subject is focused.

H. Variation Examples of Individual Embodiments as Described Above

The following variation examples are also possible for the individual embodiments as described above.

(H1) The focus positions and the photographic subject distances are set corresponding to the zoom magnification in the focus position tables shown in FIG. 2A and FIG. 2B and in the photographic subject distance table shown in FIG. 5. However, it is also possible that the focus position and the photographic subject distance are set corresponding only to the reference magnification (for example, Zoom 1), and the focus position and the photographic subject distance that have been set are modified in accordance with the present zoom magnification.

Furthermore, it is also possible that the focus positions and the photographic subject distances are calculated using the calculating formula, instead of using the focus position table and the photographic subject distance table.

Furthermore, the zoom magnification need not be verified for the focus position.

(H2) In addition, in the individual embodiments of the present invention as described above, it is also possible that the pan focus processing is executed only when the zoom magnification of the optical zoom is within a range from 1-fold to a predetermined magnification, and the auto-focus processing is executed when the zoom magnification of the optical zoom is larger than a predetermined magnification.

In this case, it is possible that the focus processing is executed corresponding to the zoom magnification of the optical zoom, regardless of whether the shutter button has been fully depressed without stopping. In addition, in the embodiments, multiple types of the priority pan focus (the person-priority pan focus, the short-distance priority pan focus, the long-distance priority pan focus with full aperture, and the long-distance priority pan focus without full aperture) are provided and the pan focus processing is executed corresponding to the determined type of the priority pan focus. However, it is also possible that only one type of the priority pan focus is provided. That is, there is no need for separating the pan focus processing into multiple types.

In a conventional art, the pan focus processing is executed in all cases regardless of the zoom magnification of the optical zoom. However, if the pan focus processing is executed even in the case where the zoom magnification of the optical zoom is larger than a predetermined magnification, the photographic subject is likely to be out of focus and therefore appropriate pan focus processing cannot be executed.

Executing the pan focus processing only in the case where the zoom magnification of the optical zoom is within a range from 1-fold to a predetermined magnification enables focusing on the true photographic subject quickly and appropriately. In addition, in the case where the zoom magnification of the optical zoom is larger than a predetermined magnification, executing the auto-focus processing enables appropriately focusing on the true photographic subject although it takes some time for focusing.

(H3) Furthermore, in the individual embodiments of the present invention as described, multiple types of the non-person priority pan focus are provided (the short-distance priority pan focus, the long-distance priority pan focus with full aperture and the long-distance priority pan focus without full aperture). However, it is also possible to provide only one type.

(H4) The individual embodiments of the present invention as described above are merely examples as a best mode for carrying out the invention, and aims to facilitate understanding of the principle and the structure of the present invention. It is not intended to limit the scope of the accompanying claims.

Therefore, it should be construed that various variations and modifications for the above-described embodiments of the present invention be included in the scope of the present invention and protected by the scope of the accompanying claim of the present invention.

Lastly, in the individual embodiments as described above, a case where an imaging apparatus of the present invention is applied to the digital camera 1 is described. However, the present invention is not limited to the above-described embodiments. In other words, the present invention may be applied to and any apparatus as long as it can focus on the photographic subject.

Furthermore, although the processing program of the imaging apparatus which is a preferred embodiment of the present invention is stored in the memory (for example, ROM, etc.) of the imaging apparatus, the processing program may be stored on any computer-readable medium.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   an imaging section which images a photographic subject;
   a face detecting section which detects a face anywhere within image data picked up by the imaging section;
   a judging section which judges whether or not the face has been detected anywhere within the image data by the face detecting section;
   a face focus controlling section which, when the judging section judges that the face has been detected anywhere within the image data, controls to perform focus processing on the face;
   a photography scene judging section which, when the judging section judges that the face has not been detected anywhere within the image data, judges a photography scene based on the image data picked up by the imaging section so as to judge how far the imaging apparatus is from the photographic subject;
   a pan focus determining section which determines a type of pan focus based on the photography scene judged by the photography scene judging section;
   a pan focus controlling section which, when the judging section judges that the face has not been detected anywhere within the image data, controls to perform pan focus processing corresponding to the type of pan focus determined by the pan focus determining section;
   a number of faces judging section which judges whether a single face has been detected or multiple faces have been detected anywhere within the image data by the face detecting section; and
   a face identifying section which identifies a face which serves as a main photographic subject from among the detected multiple faces, when the number of faces judging section judges that the multiple faces have been detected anywhere within the image data;
   wherein the face focus controlling section controls to perform the focus processing on the detected face when the number of faces judging section judges that the single face has been detected, and controls to perform the focus processing on the main photographic subject when the number of faces judging section judges that the multiple faces have been detected.

2. The imaging apparatus according to claim 1, further comprising:
   a display controlling section which distinctly displays the main photographic subject identified by the face identifying section;
   wherein the face focus controlling section controls to perform the focus processing on the main photographic subject distinctly displayed by the display controlling section.

3. The imaging apparatus according to claim 1, wherein the face identifying section identifies the face which serves as the main photographic subject based on at least one of a size of each detected face, a distance from a center of field angle to each detected face, and a face-likeness of each detected face.

4. The imaging apparatus according to claim 1, wherein the face detecting section detects only a face whose proportion is equal to or more than a predetermined percentage to the whole image picked up by the imaging section.

5. The imaging apparatus according to claim 1, wherein the face focus controlling section controls to perform the focus processing on the detected face by acquiring a focus position for person-priority, when the face is detected by the face detecting section.

6. The imaging apparatus according to claim 1, wherein the face focus controlling section controls to perform the focus processing based on a size of the detected face, when the face is detected by the face detecting section.

7. The imaging apparatus according to claim 1, wherein the photography scene judging section judges the photography scene based on at least one of whether or not shooting is with a strobe flash, whether or not illumination is either one of ultra-high illumination and ultra-low illumination, whether or not a flicker has been detected, whether or not a light source is sunlight, and whether or not an aperture is full.

8. The imaging apparatus according to claim 1, further comprising:
   a zoom controlling section which changes a zoom magnification by performing zoom processing;
   wherein the face focus controlling section and the pan focus controlling section control to perform the focus processing and the pan focus processing, taking the zoom magnification changed by the zoom controlling section into consideration.

9. The imaging apparatus according to claim 1, further comprising:
   a shutter button which instructs shooting and which is capable of being half depressed and fully depressed;
   a first judging section which judges whether or not the shutter button has been fully depressed without stopping; and
   a second judging section which judges whether or not the shutter button has been half depressed;
   wherein the face focus controlling section controls to perform the focus processing on the face detected by the face detecting section, when the first judging section judges that the shutter button has been fully depressed without stopping; and
   wherein the pan focus controlling section controls to perform the pan focus processing corresponding to the type of pan focus determined by the pan focus determining section, when the face is not detected by the face detecting section.

10. The imaging apparatus according to claim 9, further comprising:
an auto-focus controlling section which controls to perform auto-focus processing on the photographic subject;
wherein the auto-focus control section controls to perform the auto-focus processing on the detected face, when the second judging section judges that the shutter button has been half depressed.

11. The imaging apparatus according to claim 10, further comprising:
a zoom magnification judging section which judges whether or not a zoom magnification of an optical zoom changed by a zoom controlling section is smaller than a predetermined zoom magnification;
wherein when the zoom magnification judging section judges that the zoom magnification of the optical zoom is not smaller than the predetermined zoom magnification: (i) the face focus controlling section and the pan focus controlling section inhibit control of the focus processing and the pan focus processing; and (ii) the auto-focus controlling section controls to perform the auto-focus processing.

12. The imaging apparatus according to claim 11, further comprising:
an AF failure judging section which judges whether or not the auto-focus processing performed by the auto-focus controlling section has failed;
wherein the pan focus controlling section controls to perform the pan focus processing, when the AF failure judging section judges that the auto-focus processing has failed.

13. The imaging apparatus according to claim 10, wherein the auto-focus controlling section controls to perform the auto-focus processing on an AF area based on a position of the detected face, when the face is detected by the face detecting section, and controls to perform the auto-focus processing on an AF area at a predetermined position, when the face is not detected by the face detecting section.

14. The imaging apparatus according to claim 13, wherein the auto-focus controlling section controls to perform the auto-focus processing on the AF area based on the position of the detected face, when a judgment is made that the face has been detected by the face detecting section and when a number of faces judging section judges that a single face has been detected, and
wherein the auto-focus controlling section controls to perform the auto-focus processing on an AF area based on a position of a face which is identified to serve as a main photographic subject from among detected multiple faces, when the number of faces judging section judges that the multiple faces have been detected.

15. The imaging apparatus according to claim 10, further comprising:
a third judging section which judges whether or not the shutter button has been fully depressed when the second judging section judges that the shutter button has been half depressed;
wherein the first judging section judges that the shutter button has been fully depressed without stopping in a case where the auto-focus processing performed by the auto-focus controlling section is not completed when the third judging section judges that the shutter button has been fully depressed.

16. The imaging apparatus according to claim 9, wherein the first judging section judges that the shutter button has been fully depressed without stopping, when the shutter button is fully depressed before a predetermined time is passed after a half depression of the shutter button; and
wherein the second judging section judges that the shutter button has been half depressed, when the predetermined time is passed without the shutter button being fully depressed after the half depression of the shutter button.

17. The imaging apparatus according to claim 9, wherein the first judging section judges that the shutter button has been fully depressed without stopping, when a judgment is made that the shutter button has been fully depressed without the second judging section judging that the shutter button has been half depressed.

18. An imaging method of an imaging apparatus comprising an imaging section which images a photographic subject, the method comprising:
detecting a face anywhere within image data picked up by the imaging section;
judging whether or not the face has been detected anywhere within the image data;
when it is judged that the face has been detected anywhere within the image data, controlling to perform focus processing on the face;
when it is judged that the face has not been detected anywhere within the image data, judging a photography scene based on the image data picked up by the imaging section so as to judge how far the imaging apparatus is from the photographic subject;
determining a type of pan focus based on the judged photography scene;
when it is judged that the face has not been detected anywhere within the image data, controlling to perform pan focus processing corresponding to the determined type of pan focus;
judging whether a single face has been detected or multiple faces have been detected anywhere within the image data;
identifying a face which serves as a main photographic subject from among the detected multiple faces, when it is judged that the multiple faces have been detected anywhere within the image data; and
controlling to perform the focus processing on the detected face when it has been judged that the single face has been detected, and controlling to perform the focus processing on the main photographic subject when it has been judged that the multiple faces have been detected.

19. A non-transitory computer readable storage medium having a program stored thereon for a computer of an imaging apparatus comprising an imaging section which images a photographic subject, the program causing the computer of the imaging apparatus to perform functions comprising:
detecting a face anywhere within image data picked up by the imaging section;
judging whether or not the face has been detected anywhere within the image data;
when it is judged that the face has been detected anywhere within the image data, controlling to perform focus processing on the face;
when it is judged that the face has not been detected anywhere within the image data, judging a photography scene based on the image data picked up by the imaging section so as to judge how far the imaging apparatus is from the photographic subject;
determining a type of pan focus based on the judged photography scene;

when it is judged that the face has not been detected anywhere within the image data, controlling to perform pan focus processing corresponding to the determined type of pan focus;
judging whether a single face has been detected or multiple faces have been detected anywhere within the image data;
identifying a face which serves as a main photographic subject from among the detected multiple faces, when it is judged that the multiple faces have been detected anywhere within the image data; and
controlling to perform the focus processing on the detected face when it has been judged that the single face has been detected, and controlling to perform the focus processing on the main photographic subject when it has been judged that the multiple faces have been detected.

* * * * *